US012695472B2

(12) United States Patent
Arima et al.

(10) Patent No.: US 12,695,472 B2
(45) Date of Patent: Jul. 28, 2026

(54) HIGH FREQUENCY MODULE AND COMMUNICATION DEVICE

(71) Applicant: Murata Manufacturing Co., Ltd., Nagaokakyo (JP)

(72) Inventors: Keisuke Arima, Nagaokakyo (JP); Kazuma Sugiura, Nagaokakyo (JP); Hiroaki Takaoka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 227 days.

(21) Appl. No.: 18/780,829

(22) Filed: Jul. 23, 2024

(65) Prior Publication Data

US 2025/0080143 A1 Mar. 6, 2025

(30) Foreign Application Priority Data

Aug. 31, 2023 (JP) ................................. 2023-140813

(51) Int. Cl.
  *H04B 1/00* (2006.01)
  *H04B 1/44* (2006.01)
(52) U.S. Cl.
  CPC ........... *H04B 1/0078* (2013.01); *H04B 1/006* (2013.01); *H04B 1/44* (2013.01)

(58) Field of Classification Search
  CPC ......... H04B 1/0078; H04B 1/006; H04B 1/44
  USPC .......................................................... 455/552
  See application file for complete search history.

(56) References Cited

U.S. PATENT DOCUMENTS

| | | | |
|---|---|---|---|
| 2017/0353287 A1* | 12/2017 | Onaka .................. | H04B 1/0475 |
| 2022/0069850 A1* | 3/2022 | Loh ...................... | H04B 1/0458 |
| 2022/0173765 A1* | 6/2022 | Takenaka ................. | H04B 1/00 |

FOREIGN PATENT DOCUMENTS

WO 2021/039061 A1 3/2021

* cited by examiner

*Primary Examiner* — Nathan P Brittingham
(74) *Attorney, Agent, or Firm* — XSENSUS LLP

(57) ABSTRACT

A high frequency module includes a low noise amplifier, a switch, a first inductor, a second inductor, a first filter, and a second filter. The first inductor is connected between the low noise amplifier and an output terminal of the switch. The second inductor is connected between a path between the first inductor and the output terminal of the switch, and an input/output terminal of the switch. The switch is configured to switch between a first state where a first input terminal connected to the first filter and the output terminal are connected, and the input/output terminal and a ground terminal are connected, and a second state where a second input terminal connected to the second filter and the input/output terminal are connected.

20 Claims, 9 Drawing Sheets

HIGH FREQUENCY MODULE AND COMMUNICATION DEVICE

CROSS-REFERENCE TO RELATED APPLICATION

This application claims priority to Japanese Patent Application No. 2023-140813 filed on Aug. 31, 2023. The entire content of the above-identified application, including the specifications, drawings and claims, is incorporated herein by reference in its entirety.

BACKGROUND OF THE DISCLOSURE

1. Field of the Disclosure

The present disclosure relates to a high frequency module and a communication device.

2. Description of the Related Art

In the related art, a high frequency circuit (e.g., high frequency module) which can correspond to a plurality of communication bands is known (for example, refer to International Publication No. 2021/039061). The high frequency circuit described in International Publication No. 2021/039061 includes a low noise amplifier, a first inductor, and a second inductor. In the high frequency circuit described in International Publication No. 2021/039061, the second inductor connected to a ground is connected to a reception path, the first inductor, and a series circuit of the low noise amplifier. The high frequency circuit described in International Publication No. 2021/039061 is configured to be capable of switching between whether a first end of the second inductor is connected to the reception path and the second end is connected to the ground, or whether the second end of the second inductor is connected to the reception path and the first end is connected to the ground.

SUMMARY OF THE DISCLOSURE

In the high frequency module in International Publication No. 2021/039061, in some cases, it may be difficult to obtain desired characteristics in any of a plurality of communication bands.

The present disclosure aims to provide a high frequency module and a communication device which can achieve a reduced loss of a reception signal and a reduced leakage of a transmission signal for any of the plurality of communication bands.

A high frequency module according to an aspect of the present disclosure includes a low noise amplifier, a switch, a first inductor, a second inductor, a first filter, and a second filter. The switch includes a first input terminal, a second input terminal, an output terminal, an input/output terminal, and a ground terminal. The first inductor is connected between the low noise amplifier and the output terminal. The second inductor is connected between a path between the first inductor and the output terminal, and the input/output terminal. The first filter is connected to the first input terminal, and has a pass band including a reception band of a first communication band. The second filter is connected to the second input terminal, and has a pass band including a reception band of a second communication band. The second communication band has a wider transmission-reception gap than that of the first communication band. The switch is configured to switch between a first state and a second state. In the first state, the switch connects the first input terminal and the output terminal, connects the input/output terminal and the ground terminal, and does not connect the second input terminal and the input/output terminal. In the second state, the switch connects the second input terminal and the input/output terminal, does not connect the first input terminal and the output terminal, and does not connect the input/output terminal and the ground terminal.

In addition, a high frequency module according to another aspect of the present disclosure includes a low noise amplifier, a switch, a first inductor, a second inductor, a first filter, and a second filter. The switch includes a first input terminal, a second input terminal, an output terminal, a first input/output terminal, a second input/output terminal, a third input/output terminal, and a ground terminal. The first inductor is connected between a path between the low noise amplifier and the output terminal, and the first input/output terminal. The second inductor is connected between the second input/output terminal and the third input/output terminal. The first filter is connected to the first input terminal, and has a pass band including a reception band of a first communication band. The second filter is connected to the second input terminal, and has a pass band including a reception band of a second communication band. The second communication band has a wider transmission-reception gap than that of the first communication band. The switch is configured to switch between a first state and a second state. In the first state, the switch connects the first input terminal and the first input/output terminal, connects the first input terminal and the third input/output terminal, connects the second input/output terminal and the ground terminal, does not connect the second input terminal and the second input/output terminal, does not connect the third input/output terminal and the output terminal, and does not connect the first input/output terminal and the ground terminal. In the second state, the switch connects the second input terminal and the second input/output terminal, connects the third input/output terminal and the output terminal, connects the first input/output terminal and the ground terminal, does not connect the first input terminal and the first input/output terminal to each other, does not connect the first input terminal and the third input/output terminal to each other, and does not connect the second input/output terminal and the ground terminal.

A communication device according to still another aspect of the present disclosure includes the high frequency module, and a signal processing circuit connected to the high frequency module.

According to the high frequency module and the communication device in the above-described aspects, in any of a plurality of communication bands, a loss of a reception signal can be reduced, and a leakage of a transmission signal can be reduced.

DESCRIPTION OF THE EMBODIMENTS

Figure 1:
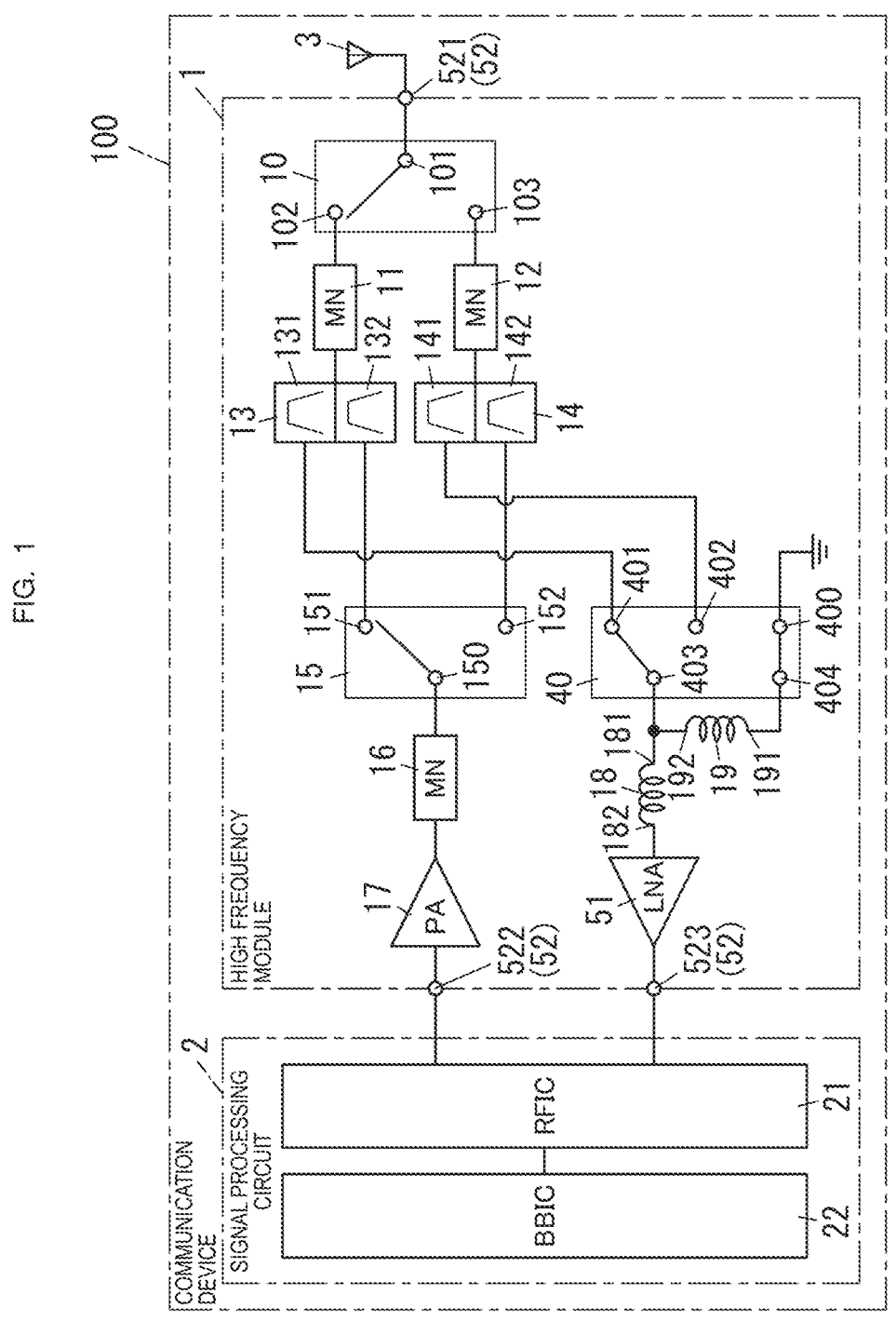
FIG. 1 is a circuit configuration diagram of a communication device including a high frequency module according to Embodiment 1.

Hereinafter, Embodiments 1 to 7 will be described with reference to the drawings. The drawings referred to in the following embodiments, for example, are schematic views, and a size and a thickness of each component in the drawings do not necessarily reflect actual dimensions, and a size ratio and a thickness ratio between the components do not necessarily reflect the actual dimensional ratios.

Embodiment 1

1 Configuration of High Frequency Module

First, a configuration of a high frequency module 1 according to Embodiment 1 will be described with reference to FIG. 1.

For example, the high frequency module 1 according to Embodiment 1 is used in a communication device 100. For example, the communication device 100 is a mobile phone, such as a smartphone. The communication device 100 is not limited to the mobile phone, and may be a wearable terminal, such as a smart watch, for example. For example, the high frequency module 1 is a high frequency module which can correspond to a fourth generation mobile communication (4G) standard and/or a fifth generation mobile communication (5G) standard. For example, the 4G standard can be a third generation partnership project (3GPP: registered trademark) long term evolution (LTE: registered trademark) standard. For example, the 5G standard can be 5G new radio (NR). For example, the high frequency module 1 can correspond to carrier aggregation and dual connectivity.

For example, the high frequency module 1 is provided in communication device 100 corresponding to multi-bands conforming to a communication standard of the LTE. For example, the high frequency module 1 can realize bidirectional transmission of full-duplex communication by causing a frequency division duplex (FDD) to allocate different frequencies to a transmission signal (e.g., high frequency signal for transmission) and a reception signal (e.g., high frequency signal for reception).

More specifically, the high frequency module 1 corresponds to a first communication band and a second communication band. For example, each of the first communication band and the second communication band is a communication band corresponding to FDD conforming to the communication standard of LTE. For example, the first communication band is a band 20, and for example, the second communication band is a band 28B.

Figure 2A:
FIG. 2A is a schematic view showing a relationship among a transmission band, a reception band, and a transmission-reception gap in a first communication band.
Figure 2B:
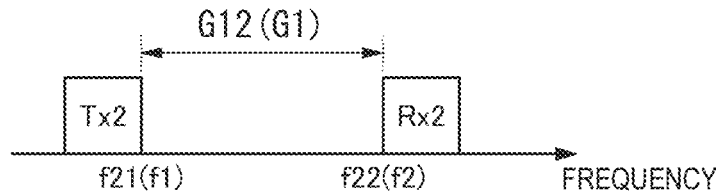
FIG. 2B is a schematic view showing a relationship among the transmission band, the reception band, and the transmission-reception gap in a second communication band.

As shown in FIG. 2A, the first communication band includes a reception band Rx1 and a transmission band Tx1. In addition, as shown in FIG. 2B, the second communication band includes a reception band Rx2 and a transmission band Tx2. In addition, a transmission-reception gap G12 of the second communication band is larger than a transmission-reception gap G11 of the first communication band. Here, a transmission-reception gap G1 of the communication band can be defined as a difference between a maximum frequency f1 of a band on a low frequency side in the reception band and the transmission band and a minimum frequency f2 of a band on a high frequency side in the reception band and the transmission band. Here, each of the maximum frequency f1 of the band on the low frequency side in the reception band and the transmission band and the minimum frequency f2 of the band on the high frequency side in the reception band and the transmission band is a value on the standard of 3GPP. As shown in FIG. 2A, in the first communication band, the band on the low frequency side in the reception band Rx1 and the transmission band Tx1 is the transmission band Tx1, and the band on the high frequency side is the reception band Rx1. Therefore, the transmission-reception gap G11 of the first communication band is a difference between the maximum frequency f11 of the transmission band Tx1 and the minimum frequency f21 of the reception band Rx1. Specifically, the transmission-reception gap G11 of the first communication band is 11 MHz. In addition, as shown in FIG. 2B, in the second communication band, the band on the low frequency side in the reception band Rx2 and the transmission band Tx2 is the transmission band Tx2, and the band on the high frequency side is the reception band Rx2. Therefore, the transmission-reception gap G12 of the second communication band is a difference between the maximum frequency f12 of the transmission band Tx2 and the minimum frequency f22 of the reception band Rx1. Specifically, the transmission-reception gap G12 of the second communication band is 25 MHz.

In addition, a power class of the transmission signal (e.g., a maximum permitted transmission power) in the second communication band has lower maximum output power than a power class of the transmission signal in the first communication band. For example, the power class of the transmission signal in the first communication band is a power class 2. In addition, for example, the power class of the transmission signal in the second communication band is a power class 3.

The high frequency module 1 can be electrically coupled to an external substrate. For example, the external substrate can correspond to a substrate (e.g., motherboard or main substrate) of a mobile phone or communication equipment. Description that the high frequency module 1 can be electrically coupled to the external substrate can be defined as not only a case where the high frequency module 1 is directly mounted on the external substrate, but also a case where the high frequency module 1 is indirectly mounted on the external substrate. The case where the high frequency module 1 is indirectly mounted on the external substrate is a case where the high frequency module 1 is mounted on another high frequency circuit mounted on the external substrate.

2 Circuit Configuration of High Frequency Module

As shown in FIG. 1, the high frequency module 1 according to Embodiment 1 includes a switch 40, a first inductor 18, and a second inductor 19. The high frequency module 1 further includes a low noise amplifier 51, a duplexer 13, and a duplexer 14. The duplexer 13 includes a first filter 131 having a pass band including the reception band of the first communication band. The duplexer 14 includes a second filter 141 having a pass band including the reception band of the second communication band. The high frequency module 1 further includes a switch 10, matching circuits 11, 12, and 16, a switch 15, a power amplifier 17, and a plurality of external connection terminals 52. The plurality of external connection terminals 52 include an antenna terminal 521, a signal input terminal 522, and a signal output terminal 523.

2.1 First Inductor

The first inductor 18 functions as a portion of the matching circuit connected between the first filter 131 or the second filter 141 and the low noise amplifier 51. The first inductor 18 includes a first end 181 and a second end 182. The first end 181 of the first inductor 18 is connected to the low noise amplifier 51. The second end 182 of the first inductor 18 is connected to the switch 40 and the second inductor 19.

2.2 Second Inductor

The second inductor 19 includes a first end 191 and a second end 192. The first end 191 of the second inductor 19 is connected to the switch 40. The second end 192 of the second inductor 19 is connected to the switch 40 and the first end 181 of the first inductor 18.

2.3 Switch

The switch 40 is a switch for selecting whether each of the first end 181 of the first inductor 18 and the first end 191 of the second inductor 19 is connected to any one of the first filter 131 of the duplexer 13, the second filter 141 of the duplexer 14, and the ground electrode, or whether each of the first end 181 of the first inductor 18 and the first end 191 of the second inductor 19 is not connected to any one. For example, the switch 40 can be configured to include a dual pole dual throw (DPDT) type switch.

The switch 40 includes a first input terminal 401 and a second input terminal 402. The first input terminal 401 is connected to the first filter 131 of the duplexer 13. The second input terminal 402 is connected to the second filter 141 of the duplexer 14.

The switch 40 further includes an output terminal 403, an input/output terminal 404, and a ground terminal 400. The output terminal 403 is connected to the first end 181 of the first inductor 18. That is, the first inductor 18 is connected between the low noise amplifier 51 and the output terminal

403. The input/output terminal 404 is connected to the first end 191 of the second inductor 19. In addition, the second end 192 of the second inductor 19 is connected to a path between the output terminal 403 of the switch 40 and the first end 181 of the first inductor 18. That is, the second inductor 19 is connected between a path between the first inductor 18 and the output terminal 403, and the input/output terminal 404. The ground terminal 400 is connected to a ground electrode.

The switch 40 can switch between a first state and a second state.

Figure 3A:
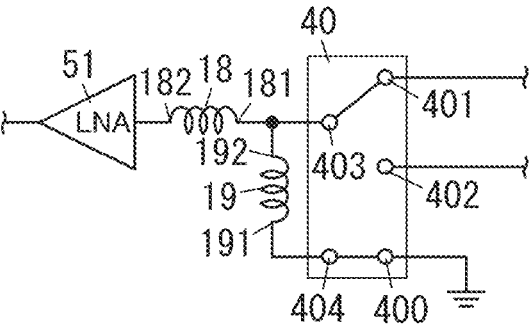
FIG. 3A is a partial circuit diagram showing a connection state when a switch of the high frequency module is in a first state.

In the first state, as shown in FIG. 3A, the first input terminal 401 and the output terminal 403 are connected, and the ground terminal 400 and the input/output terminal 404 are connected. In addition, in the first state, two terminals connected to each other in a second state (to be described later) are not connected to each other. That is, in the first state, the second input terminal 402 is not connected to the input/output terminal 404. That is, in the first state, the first inductor 18 is connected between the first filter 131 and the low noise amplifier 51. In addition, in the first state, a path between the first inductor 18 and the first filter 131 is connected to the ground electrode with the second inductor 19 interposed therebetween.

Figure 3B:
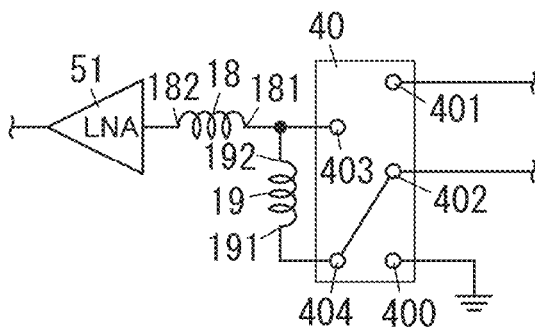
FIG. 3B is a partial circuit diagram showing a connection state when the switch of the high frequency module is in a second state.

In addition, in the second state, as shown in FIG. 3B, the second input terminal 402 and the input/output terminal 404 are connected. In addition, in the second state, two terminals connected to each other in the first state are not connected to each other. That is, in the second state, the first input terminal 401 and the output terminal 403 are not connected, and the input/output terminal 404 and the ground terminal 400 are not connected. That is, in the second state, a series circuit of the first inductor 18 and the second inductor 19 is connected between the second filter 141 and the low noise amplifier 51.

For example, the switch 40 is controlled by an RF signal processing circuit 21 of a signal processing circuit 2.

2.4 Low Noise Amplifier

The low noise amplifier 51 is an amplifier that amplifies the reception signal with a low noise. More specifically, the low noise amplifier 51 amplifies the reception signal in the first communication band and the reception signal in the second communication band. The low noise amplifier 51 includes an input terminal and an output terminal. The input terminal of the low noise amplifier 51 is connected to the second end 182 of the first inductor 18. The output terminal of the low noise amplifier 51 is connected to an external circuit (for example, the signal processing circuit 2) with the signal output terminal 523 interposed therebetween.

2.5 Duplexer

The duplexer 13 includes the first filter 131 and the transmission filter 132. For example, each of the first filter 131 and the transmission filter 132 is an acoustic wave filter including a plurality of series arm resonators and a plurality of parallel arm resonators. For example, the acoustic wave filter is a surface acoustic wave (SAW) filter using a surface acoustic wave.

The first filter 131 is a reception filter having pass band including the reception band of the first communication band. The first filter 131 includes the input terminal and the output terminal. The input terminal of the first filter 131 is connected to the switch 10 with the matching circuit 11 interposed therebetween. The output terminal of the first filter 131 is connected to the first input terminal 401 of the switch 40.

The transmission filter 132 is a transmission filter having the pass band including the transmission band of the first communication band. The transmission filter 132 includes the input terminal and the output terminal. The input terminal of the transmission filter 132 is connected to the switch 15. The output terminal of the transmission filter 132 is connected to the switch 10 with the matching circuit 11 interposed therebetween.

In the high frequency module 1, the input terminal of the first filter 131 and the output terminal of the transmission filter 132 are connected to one selection terminal of the switch 10 with the matching circuit 11 interposed therebetween.

The duplexer 14 includes the second filter 141 and the transmission filter 142. For example, each of the second filter 141 and the transmission filter 142 is the acoustic wave filter including the plurality of series arm resonators and the plurality of parallel arm resonators. For example, the acoustic wave filter is a surface acoustic wave (SAW) filter using a surface acoustic wave.

The second filter 141 is a reception filter having the pass band including the reception band of the second communication band. The second filter 141 includes the input terminal and the output terminal. The input terminal of the second filter 141 is connected to the switch 10 with the matching circuit 12 interposed therebetween. The output terminal of the second filter 141 is connected to the second input terminal 402 of the switch 40.

The transmission filter 142 is a transmission filter having the pass band including the transmission band of the second communication band. The transmission filter 142 includes the input terminal and the output terminal. The input terminal of the transmission filter 142 is connected to the switch 15. The output terminal of the transmission filter 142 is connected to the switch 10 with the matching circuit 12 interposed therebetween.

In the high frequency module 1, the input terminal of the second filter 141 and the output terminal of the transmission filter 142 are connected to one selection terminal of the switch 10 with the matching circuit 12 interposed therebetween.

2.6 Switch

The switch 10 is a switch for selecting a path connected to the antenna terminal 521 from the duplexer 13 and the duplexer 14. The switch 10 includes a common terminal 101 and selection terminals 102 and 103.

The common terminal 101 is connected to the antenna terminal 521. The selection terminal 102 is connected to the duplexer 13 with the matching circuit 11 interposed therebetween. The selection terminal 103 is connected to the duplexer 14 with the matching circuit 12 interposed therebetween.

For example, the switch 10 is controlled by the RF signal processing circuit 21 of the signal processing circuit 2.

The switch 15 is a switch for selecting a path connected to the power amplifier 17 from the transmission filters 132 and 142. The switch 15 includes a common terminal 150 and selection terminals 151 and 152.

The common terminal 150 is connected to the power amplifier 17 with the matching circuit 16 interposed therebetween. The selection terminal 151 is connected to the input terminal of the transmission filter 132 included in the duplexer 13. The selection terminal 152 is connected to the input terminal of the transmission filter 142 included in the duplexer 14.

For example, the switch 15 is controlled by the RF signal processing circuit 21 of the signal processing circuit 2.

2.7 Power Amplifier

The power amplifier 17 is an amplifier that amplifies the transmission signal. The power amplifier 17 includes the input terminal (not shown) and the output terminal (not shown). The input terminal of the power amplifier 17 is connected to an external circuit (for example, the signal processing circuit 2) with the signal input terminal 522 interposed therebetween. The output terminal of the power amplifier 17 is connected to the common terminal 150 of the switch 15 with the matching circuit 16 interposed therebetween.

2.8 Matching Circuit

The matching circuit 11 is a circuit for matching impedance of the duplexer 13 connected with the matching circuit 11 interposed therebetween and impedance of the antenna terminal 521. The matching circuit 11 includes at least one of an inductor and a capacitor.

The matching circuit 12 is a circuit for matching the impedance of the duplexer 14 connected with the matching circuit 12 interposed therebetween and the impedance of the antenna terminal 521. The matching circuit 12 includes at least one of the inductor and the capacitor.

The matching circuit 16 is a circuit for matching the impedance of the transmission filter 132 or the transmission filter 142 connected with the matching circuit 16 interposed therebetween and the impedance of the power amplifier 17. The matching circuit 16 includes at least one of the inductor and the capacitor.

2.9 External Connection Terminal

The plurality of external connection terminals 52 are terminals for electrically coupling an external circuit (for example, the signal processing circuit 2). The plurality of external connection terminals 52 include the antenna terminal 521, the signal input terminal 522, the signal output terminal 523, a plurality of control terminals (not shown), and a plurality of ground terminals (not shown).

An antenna 3 is connected to the antenna terminal 521. In the high frequency module 1, the antenna terminal 521 is connected to the common terminal 101 of the switch 10.

The signal input terminal 522 is a terminal for inputting the transmission signal from the external circuit (for example, the signal processing circuit 2) to the high frequency module 1. In the high frequency module 1, the signal input terminal 522 is connected to the input terminal of the power amplifier 17.

The signal output terminal 523 is a terminal for outputting the reception signal from the high frequency module 1 to the external circuit (for example, the signal processing circuit 2). In the high frequency module 1, the signal output terminal 523 is connected to the output terminal of the low noise amplifier 51.

The plurality of control terminals are terminals for inputting control signals from the external circuit (for example, the signal processing circuit 2) to the high frequency module 1.

The plurality of ground terminals are terminals electrically coupled to a ground electrode of an external substrate (not shown) included in the communication device 100, and to which a ground potential is applied. One of the plurality of ground terminals is connected to the ground terminal 400 of the switch 40. In the high frequency module 1, the plurality of ground terminals are connected to a ground layer (not shown) of a substrate 6 (refer to FIG. 4).

3 Configuration of Communication Device

As shown in FIG. 1, the communication device 100 includes the high frequency module 1, the signal processing circuit 2, and the antenna 3.

The antenna 3 is connected to the antenna terminal 521 of the high frequency module 1. The antenna 3 has a transmission function of emitting the transmission signal output from the high frequency module 1 as a radio wave, and a reception function of receiving the reception signal from an outside as a radio wave and outputting the reception signal to the high frequency module 1.

The signal processing circuit 2 includes the RF signal processing circuit 21 and a baseband signal processing circuit 22. The signal processing circuit 2 processes a signal passing through the high frequency module 1. More specifically, the signal processing circuit 2 processes the transmission signal and the reception signal.

For example, the RF signal processing circuit 21 is a radio frequency integrated circuit (RFIC). The RF signal processing circuit 21 performs signal processing on a high frequency signal.

The RF signal processing circuit 21 performs signal processing and amplification, such as up-converting, on the transmission signal transmitted from the baseband signal processing circuit 22, and outputs the transmission signal subjected to the signal processing to the high frequency module 1. In addition, the RF signal processing circuit 21 performs signal processing, such as amplification and down-converting, on the reception signal output from the high frequency module 1, and outputs the reception signal subjected to the signal processing to the baseband signal processing circuit 22.

For example, the baseband signal processing circuit 22 is a baseband integrated circuit (BBIC). The baseband signal processing circuit 22 performs predetermined signal processing on the transmission signal from the outside of the signal processing circuit 2. For example, the reception signal processed by the baseband signal processing circuit 22 is used as an image signal for an image display, or is used as an audio signal for a conversation.

In addition, the RF signal processing circuit 21 also has a function as a control unit that controls connection of each of the switch 40, the switch 10, the switch 15 which are included in the high frequency module 1, based on transmission and reception of the high frequency signals (transmission signal and reception signal). Specifically, the RF signal processing circuit 21 uses a control signal (not shown) to switch each connection of the switch 40, the switch 10, and the switch 15 of the high frequency module 1. The control unit may be provided outside the RF signal processing circuit 21, and may be provided in the high frequency module 1 or the baseband signal processing circuit 22, for example.

4 Structure of High Frequency Module

Next, a structure of the high frequency module 1 according to Embodiment 1 will be described with reference to FIG. 4.

Figure 4:
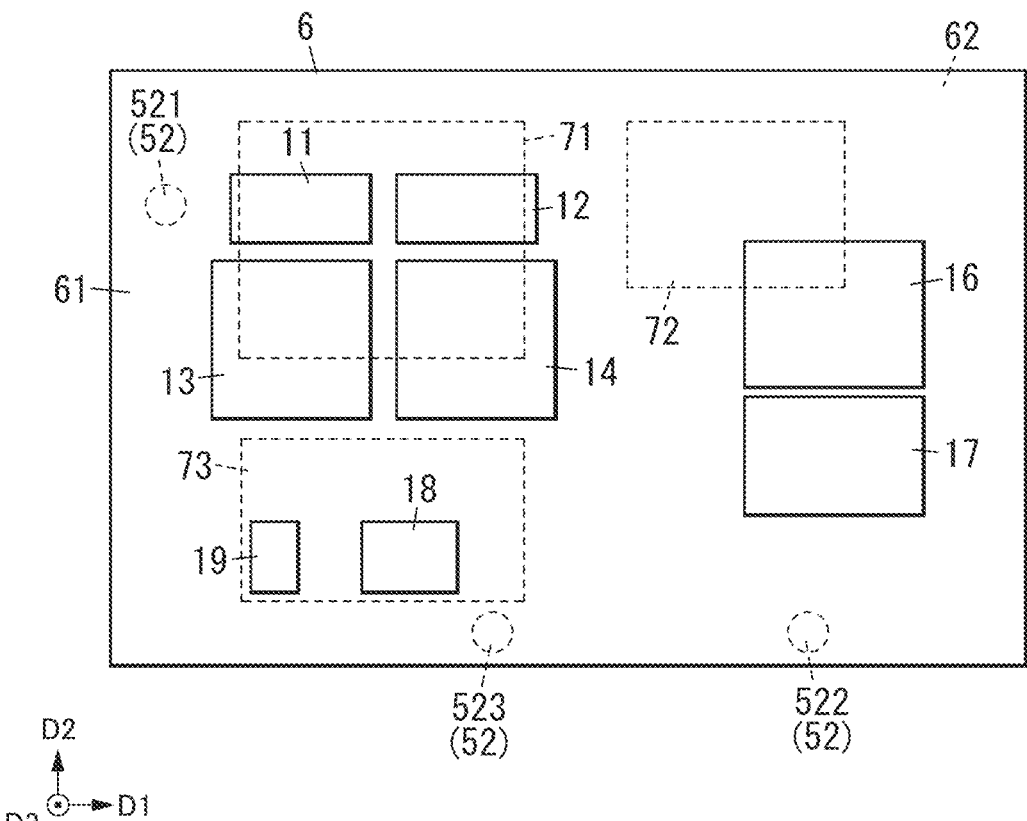
FIG. 4 is a plan view of the high frequency module.

As shown in FIG. 4, the high frequency module 1 includes the substrate 6, the matching circuits 11, 12, and 16, the duplexer 13, the duplexer 14, the power amplifier 17, the first inductor 18, the second inductor 19, and the IC chips 71, 72, and 73. In the following description, a long axis direction of the substrate 6 will be referred to as a first direction D1, a short axis direction of the substrate 6 will be referred to as a second direction D2, and a thickness direction of the substrate 6 will be referred to as a third direction D3. The first direction D1, the second direction D2, and the third direction D3 are orthogonal to each other.

The high frequency module 1 is electrically coupled to an external substrate (not shown). For example, the external substrate corresponds to a mother substrate of the communication device 100 (refer to FIG. 1), such as a mobile phone and communication equipment.

4.1 Substrate

As shown in FIG. 4, the substrate 6 includes a first main surface 61 and a second main surface 62. The first main surface 61 and the second main surface 62 face each other in the third direction D3 which is the thickness direction of the substrate 6. When the high frequency module 1 is provided in the external substrate, the second main surface 62 faces a main surface on the substrate 6 side in the external substrate. The substrate 6 is a double-sided mounting substrate in which the matching circuits 11, 12, and 16, the duplexer 13, the duplexer 14, the power amplifier 17, the first inductor 18, and the second inductor 19 are mounted on the first main surface 61, and the IC chip 71, 72, and 73, and the plurality of external connection terminals 52 are mounted on the second main surface 62.

The substrate 6 is a multilayer substrate in which a plurality of dielectric layers are laminated. The substrate 6 includes a plurality of conductive layers and a plurality of via conductors (including a through electrode). The plurality of conductive layers include a ground electrode of a ground potential. The plurality of via conductors are used for electrical coupling and elements mounted on each of the first main surface 61 and the second main surface 62 and the conductive layer of the substrate 6. The elements mounted on each of the first main surface 61 and the second main surface 62 are the matching circuits 11, 12, and 16, the duplexer 13, the duplexer 14, the power amplifier 17, the first inductor 18, the second inductor 19, the IC chips 71, 72, and 73, and the plurality of external connection terminals 52.

4.2 IC Chip

The IC chip 71 is disposed on the second main surface 62 of the substrate 6. For example, the IC chip 71 includes the switch 10.

The IC chip 72 is disposed on the second main surface 62 of the substrate 6. For example, the IC chip 72 includes the switch 15.

The IC chip 73 is disposed on the second main surface 62 of the substrate 6. For example, the IC chip 73 includes the low noise amplifier 51 and the switch 40.

4.3 Disposition in High Frequency Module

The first inductor 18 and the second inductor 19 are disposed adjacent to each other on the first main surface 61 of the substrate 6. Here, description that "the first inductor 18 and the second inductor 19 are disposed adjacent to each other on the first main surface 61 of the substrate 6" can mean that the first inductor 18 and the second inductor 19 are disposed on the first main surface 61 of the substrate 6, and no element is disposed between the first inductor 18 and the second inductor 19 on the first main surface 61.

Figure 12:
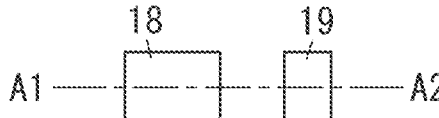
FIG. 12 is a plan view showing a relationship between a winding axis of a first inductor and a winding axis of a second inductor in the high frequency module.

In addition, a direction A1 (refer to FIG. 12) of a winding axis of the first inductor 18 and a direction A2 (refer to FIG. 12) of a winding axis of the second inductor 19 are parallel to each other. Here, description that "the direction A1 of the winding axis of the first inductor 18 and the direction A2 of the winding axis of the second inductor 19 are parallel to each other" is defined as an angle formed by the direction A1 of the winding axis of the first inductor 18 and the direction A2 of the winding axis of the second inductor 19 is 45 degrees or smaller as shown in FIG. 12. It is more preferable that the angle formed by the direction A1 of the winding axis of the first inductor 18 and the direction A2 of the winding axis of the second inductor 19 is 10 degrees or smaller. In this manner, a magnetic field generated in the first inductor 18 and a magnetic field generated in the second inductor 19 are further strengthened together. Accordingly, the first inductor 18 and the second inductor 19 are magnetically coupled. In this manner, for example, when the first inductor 18 and the second inductor 19 are connected in series, a Q value of a series circuit of the first inductor 18 and the second inductor 19 is greater than a Q value of a series circuit of the first inductor 18 and the second inductor 19 when the first inductor 18 and the second inductor 19 are not magnetically coupled. Therefore, when the matching circuit between the first filter 131 and the low noise amplifier 51 is a circuit including both the first inductor 18 and the second inductor 19, a loss of the reception signal in the first communication band can be reduced.

In addition, the first inductor 18 is larger than the second inductor 19. It is preferable that the first inductor 18 has smaller resistance than that of the second inductor 19 to be always connected in series between the low noise amplifier 51 and the first filter 131 or the second filter 141. On the other hand, the second inductor 19 is connected to the first inductor 18 in series, when connected in series between the low noise amplifier 51 and the first filter 131 or the second filter 141. As described above, the Q value of the series circuit of the first inductor 18 and the second inductor 19 is greater than that of the series circuit of the first inductor 18 and the second inductor 19, when the first inductor 18 and the second inductor 19 are not magnetically coupled. Therefore, even when the second inductor 19 is small, a loss of the reception signal is smaller than that of a single inductor having the same inductance as that of the series circuit of the first inductor 18 and the second inductor 19.

In addition, the first inductor 18 overlaps the IC chip 73 in a plan view when viewed in the third direction D3 which is the thickness direction of the substrate 6. Here, description that "the first inductor 18 overlaps the IC chip 73 in a plan view when viewed in the third direction D3" means that at least a portion of the first inductor 18 overlaps at least a portion of the IC chip 73 in the plan view when viewed in the third direction D3. In this manner, a length of a wiring portion between the second end 182 of the first inductor 18 and the low noise amplifier 51 included in the IC chip 73 can be shortened. Therefore, the loss of the reception signal of the high frequency module 1 is reduced. In addition, the length of the wiring portion between the first inductor 18 and the switch 40 included in the IC chip 73 can be shortened, and the loss of the reception signal of the high frequency module 1 can be reduced.

In addition, the second inductor 19 overlaps the IC chip 73 in a plan view when viewed in the third direction D3 which is the thickness direction of the substrate 6. Here, description that "the second inductor 19 overlaps the IC chip 73 in a plan view when viewed in the third direction D3" means that at least a portion of the second inductor 19 overlaps at least a portion of the IC chip 73 in a plan view when viewed in the third direction D3. In this manner, each length of the wiring portion between the output terminal 403 of the switch 40 and the second end 192 of the second inductor 19 and the wiring portion between the input/output terminal 404 of the switch 40 and the first end 191 of the second inductor 19 can be shortened. Therefore, the loss of the reception signal of the high frequency module 1 is reduced.

5 Operation of High Frequency Module

Hereinafter, an operation of the high frequency module 1 according to Embodiment 1 will be described with reference to FIGS. 3A and 3B.

In the high frequency module 1 according to Embodiment 1, the second end 182 of the first inductor 18 is connected to the input terminal of the low noise amplifier 51. In addition, the first end 181 of the first inductor 18 is connected to any one of the first filter 131 and the second filter 141 with the switch 40 interposed therebetween. Furthermore, the first end 181 of the first inductor 18 can be connected to the ground electrode with the second inductor 19 interposed therebetween.

When the second inductor 19 is connected to the ground electrode, a circuit between the first input terminal 401 or the second input terminal 402 of the switch 40 and the low noise amplifier 51 includes the first inductor 18 and the second inductor 19, and an impedance mismatch with the low noise amplifier 51 transmitted from the antenna terminal 521 of the high frequency module 1 is induced. That is, even when a portion of the transmission signal output from the power amplifier 17 leaks from the duplexer 13 or the duplexer 14 to the switch 40, a portion of the leaking transmission signal is less likely to reach the low noise amplifier 51. On the other hand, in a configuration in which the second inductor 19 is connected to the ground electrode and in a configuration in which the second inductor 19 is not connected to the ground electrode, characteristics of the circuit are different between the first input terminal 401 or the second input terminal 402 of the switch 40 and the low noise amplifier 51. Therefore, in some cases, depending on the communication band, the loss of the reception signal may be reduced, and satisfactory characteristics may be obtained when the second inductor 19 is not connected to the ground.

As described above, in the first communication band, the transmission-reception gap G11 between the transmission band Tx1 and the reception band Rx1 is smaller than the transmission-reception gap G12 of the second communication band. In addition, the transmission signal in the first communication band is the transmission signal of the power class 2, and has higher maximum output power than that of the transmission signal in the second communication band. Therefore, intensity of the transmission signal in the first communication band which enters the switch 40 from the first filter 131 when (e.g., in response to) the reception signal in the first communication band is received, is stronger than intensity of the transmission signal in the second communication band which enters the switch 40 from the second filter 141 when (e.g., in response to) the reception signal in the second communication band is received.

In the high frequency module 1 according to Embodiment 1, when (e.g., in response to) the reception signal in the first communication band is received, the switch 40 is set to the first state as shown in FIG. 3A. Therefore, the first end 181 of the first inductor 18 is connected to the first filter 131 with the switch 40 interposed therebetween. Furthermore, the first end 181 of the first inductor 18 is connected to the ground electrode with the second inductor 19 interposed therebetween. Therefore, the high frequency module 1 can highly accurately remove the transmission signal in the first communication band which enters the switch 40 from the first filter 131 when (e.g., in response to) receiving the reception signal in the first communication band.

On the other hand, in the high frequency module 1 according to Embodiment 1, when (e.g., in response to) the reception signal in the second communication band is received, the switch 40 is set to the second state as shown in FIG. 3B. Therefore, the first end 181 of the first inductor 18 is connected to the second filter 141 with the second inductor 19 and the switch 40 interposed therebetween. That is, the series circuit of the first inductor 18 and the second inductor 19 is connected between the second filter 141 and the low noise amplifier 51. Therefore, when (e.g., in response to) receiving the reception signal in the second communication band, the high frequency module 1 can optimize the characteristics of the circuit between the second filter 141 and the low noise amplifier 51 by reducing the loss of the reception signal in the second communication band.

Advantageous Effects

The high frequency module 1 according to Embodiment 1 includes the low noise amplifier 51 that amplifies the reception signal, the switch 40, the first inductor 18, the second inductor 19, the first filter 131, and the second filter 141. The switch 40 includes the first input terminal 401, the second input terminal 402, the output terminal 403, the input/output terminal 404, and the ground terminal 400. The first inductor 18 is connected between the input terminal of the low noise amplifier 51 and the output terminal 403. The second inductor 19 is connected between a path between the first inductor 18 and the output terminal 403, and the input/output terminal 404. The first filter 131 is connected to the first input terminal 401, and has the pass band including the reception band of the first communication band. The second filter 141 is connected to the second input terminal 402, and has the pass band including the reception band of the second communication band. The second communication band has a wider transmission-reception gap than that of the first communication band. The switch 40 can switch between a first state and a second state. In the switch 40, in the first state, the first input terminal 401 and the output terminal 403 are connected, the input/output terminal 404 and the ground terminal 400 are connected, and the second input terminal 402 and the input/output terminal 404 are not connected. In the switch 40, in the second state, the second input terminal 402 and the input/output terminal 404 are connected, the first input terminal 401 and the output terminal 403 are not connected, and the input/output terminal 404 and the ground terminal 400 are not connected.

In this manner, in the high frequency module 1, when (e.g., in response to) the reception signal in the first communication band is received, the switch 40 is set to the first state. Accordingly, a leakage of the transmission signal in the first communication band to the low noise amplifier 51 can be reduced. In addition, in the high frequency module 1, when (e.g., in response to) the reception signal in the second communication band is received, the switch 40 is set to the second state. Accordingly, the loss of the reception signal in the second communication band can be reduced.

In addition, the high frequency module 1 according to Embodiment 1 includes the substrate 6. The substrate 6 includes the first main surface 61 and the second main surface 62 which face each other. The first inductor 18 and the second inductor 19 are disposed adjacent to each other on the first main surface 61 of the substrate 6. The direction A1 of the winding axis of the first inductor 18 and the direction A2 of the winding axis of the second inductor 19 are parallel to each other. In this manner, when both the first inductor 18 and the second inductor 19 are used, a loss of the reception signal in the second communication band can be reduced.

In addition, in the high frequency module 1 according to Embodiment 1, the transmission signal in the first communication band is the transmission signal of the power class 2. The transmission signal in the second communication band is the transmission signal having lower maximum output power than that of power class 2.

In this manner, in the high frequency module 1, when (e.g., in response to) the reception signal in the first communication band is received, a leakage of the transmission signal in the first communication band to the low noise amplifier 51 is reduced. When (e.g., in response to) the reception signal in the second communication band is received, a loss of the reception signal in the second communication band can be reduced.

In addition, the high frequency module 1 according to Embodiment 1 includes the transmission filter 132 having the pass band including the transmission band of the first communication band. The first filter 131 and the transmission filter 132 form the duplexer 13. In this manner, the high frequency module 1 according to Embodiment 1 corresponds to both the transmission of the transmission signal and the reception of the reception signal in the first communication band, and influence of the transmission signal in the first communication band on a reception operation in the first communication band can be reduced.

In addition, the high frequency module 1 according to Embodiment 1 includes the transmission filter 142 having the pass band including the transmission band of the second communication band. The second filter 141 and the transmission filter 142 form the duplexer 14. In this manner, the high frequency module 1 according to Embodiment 1 corresponds to both the transmission of the transmission signal and the reception of the reception signal in the second communication band, and influence of the transmission signal in the second communication band on a reception operation in the second communication band can be reduced.

In addition, in the high frequency module 1 according to Embodiment 1, the first inductor 18 is larger than the second inductor 19 in a plan view when viewed in the thickness direction D3 of the substrate 6. In this manner, when (e.g., in response to) the reception signal in the first communication band is received, the loss of the reception signal can be reduced since the Q value of the first inductor 18 is great. In addition, when (e.g., in response to) the reception signal in the second communication band is received, the circuit including the first inductor 18 and the second inductor 19 has the great Q value, even when the second inductor 19 is smaller than the first inductor 18, a loss of the reception signal is less likely to increase.

In addition, in the high frequency module 1 according to Embodiment 1, the IC chip 73 is disposed on the second main surface 62 of the substrate 6. The IC chip 73 includes the low noise amplifier 51. The first inductor 18 and the IC chip 73 overlap each other in a plan view when viewed in the thickness direction D3 of the substrate 6. In this manner, a length of a wiring portion between the second end 182 of the first inductor 18 and the low noise amplifier 51 included in the IC chip 73 can be shortened. Therefore, the loss of the reception signal of the high frequency module 1 is reduced.

In addition, in the high frequency module 1 according to Embodiment 1, the IC chip 73 further includes the switch 40. The second inductor 19 is disposed on the first main surface 61 of the substrate 6. The IC chip 73 is disposed on the second main surface 62 of the substrate 6. The second inductor 19 and the IC chip 73 overlap each other in a plan view when viewed in the thickness direction D3 of the substrate 6. In this manner, each length of the wiring portion between the output terminal 403 of the switch 40 and the second end 192 of the second inductor 19 and the wiring portion between the input/output terminal 404 of the switch 40 and the first end 191 of the second inductor 19 can be shortened. Therefore, the loss of the reception signal of the high frequency module 1 is reduced.

Embodiment 2

1 Configuration

Figure 5A:
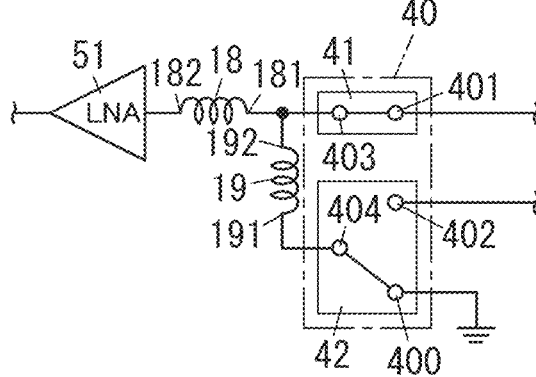
FIG. 5A is a partial circuit diagram showing a connection state when a switch of a high frequency module according to Embodiment 2 is in a first state.
Figure 5B:
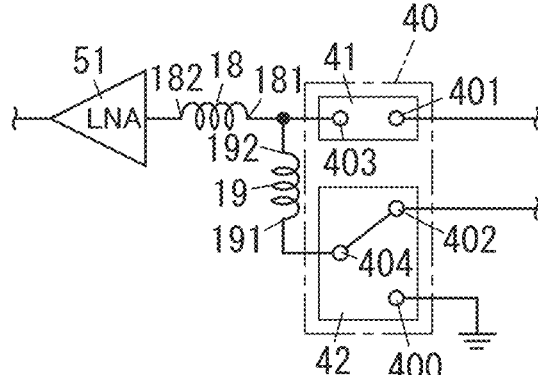
FIG. 5B is a partial circuit diagram showing a connection state when the switch of the high frequency module is in a second state.

In the high frequency module 1 according to Embodiment 2, as shown in FIGS. 5A and 5B, the switch 40 includes a first switch 41 and a second switch 42. The high frequency module 1 according to Embodiment 2 includes all of the configurations excluding the switch 40 in the high frequency module 1 according to Embodiment 1, and thus, description of the same configuration will be omitted.

The first switch 41 is a switch for selecting whether or not to connect the first end 181 of the first inductor 18 to the first filter 131.

The first switch 41 includes the first input terminal 401 and the output terminal 403. The first input terminal 401 is connected to the first filter 131. The output terminal 403 is connected to the first end 181 of the first inductor 18. The second end 192 of the second inductor 19 is connected to a path between the output terminal 403 of the switch 40 and the first end 181 of the first inductor 18.

The first switch 41 can switch between the first state and the second state. In the first state, as shown in FIG. 5A, the first input terminal 401 and the output terminal 403 are connected. In the second state, as shown in FIG. 5B, the first input terminal 401 and the output terminal 403 are not connected.

The second switch 42 is a switch for selecting a path connected to the first end 191 of the second inductor 19 from the second filter 141 of the duplexer 14 and the ground electrode.

The second switch 42 includes the second input terminal 402, the input/output terminal 404, and the ground terminal 400. The second input terminal 402 is connected to the second filter 141. The input/output terminal 404 is connected to the first end 191 of the second inductor 19. The ground terminal 400 is connected to a ground electrode.

The second switch 42 can switch between the first state and the second state. In the first state, as shown in FIG. 5A, the input/output terminal 404 and the ground terminal 400 are connected, and the second input terminal 402 and the input/output terminal 404 are not connected. In the second state, as shown in FIG. 5B, the second input terminal 402 and the input/output terminal 404 are connected, and the ground terminal 400 and the input/output terminal 404 are not connected.

For example, the first switch 41 and the second switch 42 are controlled by the RF signal processing circuit 21 of the signal processing circuit 2.

In the high frequency module 1 according to Embodiment 2, when (e.g., in response to) the reception signal in the first communication band is received, both the first switch 41 and the second switch 42 are set to the first state. In this manner, as in Embodiment 1, a leakage of the transmission signal in the first communication band to the low noise amplifier 51 can be reduced. In addition, in the high frequency module 1 according to Embodiment 2, when (e.g., in response to) the reception signal in the second communication band is received, both the first switch 41 and the second switch 42 are set to the second state. In this manner, as in Embodiment 1, a loss of the reception signal in the second communication band can be reduced. In addition, in the high frequency module 1 according to Embodiment 2, the switch 40 is separated into the first switch 41 and the second switch 42. Therefore, a loss in the switch 40 can be reduced.

Advantageous Effects

The high frequency module 1 according to Embodiment 2 includes the first switch 41 and the second switch 42 instead of the switch 40. The first switch 41 includes the first input terminal 401 and the output terminal 403, and can switch between connection and non-connection between the first input terminal 401 and the output terminal 403. The second switch 42 includes the second input terminal 402, the input/output terminal 404, and the ground terminal 400, and can connect the input/output terminal 404 to the second input terminal 402 or the ground terminal 400. In the first state, the first switch 41 connects the first input terminal 401 and the output terminal 403. In addition, in the first state, the second switch 42 connects the input/output terminal 404 and the ground terminal 400, and does not connect the second input terminal 402 and the input/output terminal 404. In the second state, the first switch 41 does not connect the first input terminal 401 and the output terminal 403. In the second state, the second switch 42 connects the second input terminal 402 and the input/output terminal 404, and does not connect the input/output terminal 404 and the ground terminal 400.

In this manner, as in the high frequency module 1 according to Embodiment 1, in the high frequency module 1 according to Embodiment 2, when (e.g., in response to) the reception signal in the first communication band is received, a leakage of the transmission signal in the first communication band to the low noise amplifier 51 can be reduced. In addition, as in the high frequency module 1 according to Embodiment 1, in the high frequency module 1 according to Embodiment 2, when (e.g., in response to) the reception signal in the second communication band is received, a loss of the reception signal in the second communication band can be reduced. In addition, in the high frequency module 1 according to Embodiment 2, the switch 40 is separated into the first switch 41 and the second switch 42. Therefore, a loss in the switch 40 can be reduced.

Embodiment 3

1 Configuration

Figure 6:
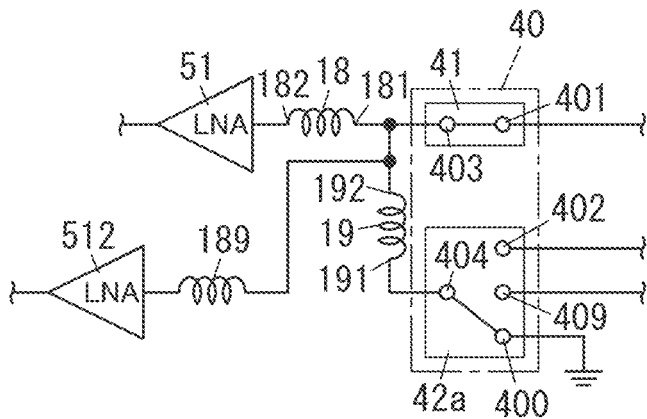
FIG. 6 is a partial circuit diagram of a high frequency module according to Embodiment 3.

As shown in FIG. 6, the high frequency module 1 according to Embodiment 3 further includes a second low noise amplifier 512 and a third inductor 189, in addition to the high frequency module 1 according to Embodiment 2, and the switch 40 includes a second switch 42a instead of the second switch 42. The high frequency module 1 according to Embodiment 3 includes all of the configurations excluding the second switch 42 in the high frequency module 1 according to Embodiment 2, and thus, description of the same configuration will be omitted.

The second switch 42a includes the second input terminal 402, the input/output terminal 404, the ground terminal 400, and a third input terminal 409. The second input terminal 402 is connected to the second filter 141 (refer to FIG. 1) of the duplexer 14. The input/output terminal 404 is connected to the first end 191 of the second inductor 19. The ground terminal 400 is connected to a ground electrode. For example, the third input terminal 409 is a terminal to which the reception signal in a third communication band is input, and is connected to a filter (not shown) having the pass band including the reception band of the third communication band.

The second switch 42a can switch a mode to a third state in addition to the first state and the second state. In the first state, the ground terminal 400 and the input/output terminal 404 are connected, and the input/output terminal 404 is not connected to any one of the second input terminal 402 and the third input terminal 409. In the second state, the second input terminal 402 and the input/output terminal 404 are connected, and the input/output terminal 404 is not connected to any one of the third input terminal 409 and the ground terminal 400. In the third state, the third input terminal 409 and the input/output terminal 404 are connected, and the input/output terminal 404 is not connected to any one of the second input terminal 402 and the ground terminal 400.

The low noise amplifier 512 is an amplifier that amplifies the reception signal with a low noise. More specifically, the second low noise amplifier 512 is an amplifier that amplifies the reception signal in the third communication band. The second low noise amplifier 512 is different from the low noise amplifier 51. In Embodiment 3, the low noise amplifier 51 corresponds to a first low noise amplifier. The input terminal of the second low noise amplifier 512 is connected to the third inductor 189. The output terminal of the second low noise amplifier 512 is connected to the external circuit (for example, the signal processing circuit 2) with one of the external connection terminal 52 interposed therebetween.

The first end of the third inductor 189 is connected to the input terminal of the second low noise amplifier 512. The second end of the third inductor 189 is connected between the second inductor 19 and a path between the first inductor 18 and the output terminal 403. That is, the third inductor 189 is connected between the second low noise amplifier 512 and a path between the second inductor 19 and the first inductor 18.

The high frequency module 1 according to Embodiment 3 performs the same operation as that of the high frequency module 1 according to Embodiment 2 on each of the reception in the first communication band and the reception in the second communication band. The high frequency module 1 according to Embodiment 3 switches the first switch 41 and the second switch 42a to the third state in the reception of the third communication band. In the third state, the first switch 41 does not connect the first input terminal 401 and the output terminal 403, as in the second state. In addition, in the third state, the second switch 42a connects the third input terminal 409 and the input/output terminal 404.

Therefore, in the high frequency module 1 according to Embodiment 3, in receiving the first communication band, the first inductor 18 is connected in series between the first input terminal 401 and the first low noise amplifier 51, and a path between the first inductor 18 and the first input terminal 401 and the ground electrode are connected with the second inductor 19 interposed therebetween. In addition, in the high frequency module 1 according to Embodiment 3, in receiving the second communication band, the series circuit of the second inductor 19 and the first inductor 18 is connected between the second input terminal 402 and the first low noise amplifier 51. Furthermore, in the high frequency module 1 according to Embodiment 3, in receiving the third communication band, a series circuit of the second inductor 19 and the third inductor 189 is connected between the third input terminal 409 and the second low noise amplifier 512. Therefore, in the high frequency module 1 according to Embodiment 3, using any one of the first low noise amplifier 51 and the second low noise amplifier 512 is switched in receiving the second communication band and in receiving the third communication band, and it becomes possible to easily change characteristics of the circuit between the second input terminal 402 of the switch 40 and the first low noise amplifier 51 and the circuit between the third input terminal 409 of the switch 40 and the second low noise amplifier 512.

Advantageous Effects

The high frequency module 1 according to Embodiment 3 further includes the second low noise amplifier 512 different from the first low noise amplifier 51, and the third inductor 189 connected to the second low noise amplifier 512. The third inductor 189 is connected between the second low noise amplifier 512 and a path between the second inductor 19 and the first inductor 18. In this manner, in the high frequency module 1 according to Embodiment 3, the second low noise amplifier 512 is used in receiving the communication band different from the first communication band and the second communication band, and the third inductor 189 and the second inductor 19 can be connected between the second low noise amplifier 512 and a reception path of the communication band. Therefore, reception characteristics of the third communication band can be optimized.

Embodiment 4

1 Configuration

Figure 7A:
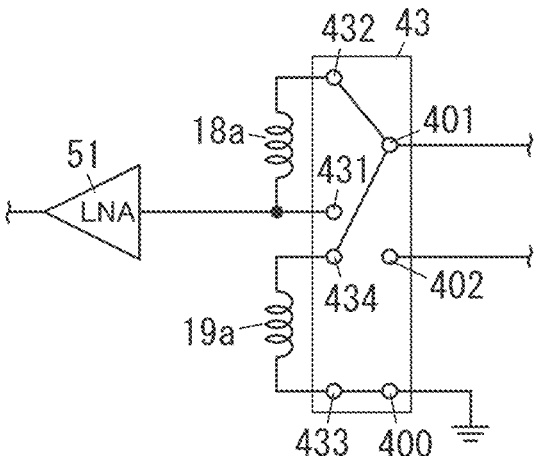
FIG. 7A is a partial circuit diagram showing a connection state when a switch of a high frequency module according to Embodiment 4 is in the first state.
Figure 7B:
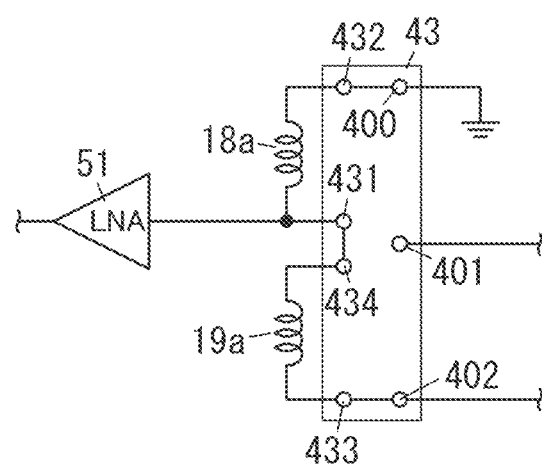
FIG. 7B is a partial circuit diagram showing a connection state when the switch of the high frequency module is in the second state.

As shown in FIGS. 7A and 7B, the high frequency module 1 according to Embodiment 4 includes a first inductor 18a, a second inductor 19a, and a switch 43 instead of the first inductor 18, the second inductor 19, and the switch 40, in addition to the high frequency module 1 according to Embodiment 1. The high frequency module 1 according to Embodiment 4 includes all of the configurations excluding the first inductor 18, the second inductor 19, and the switch 40 in the high frequency module 1 according to Embodiment 1, and thus, description of the same configuration will be omitted.

The switch 43 is a switch for selecting whether each of the first filter 131 of the duplexer 13 and the second filter 141 of the duplexer 14 is connected to any one of the first inductor 18a, the second inductor 19a, and the low noise amplifier 51. In addition, the switch 43 is a switch for selecting whether the first inductor 18a and the second inductor 19a are respectively connected to each other, and for selecting whether the ground terminal 400 is connected to any one of the first inductor 18a and the second inductor 19a. For example, the switch 40 can be configured to include a dual pole dual throw (DPDT) type switch.

The switch 43 includes the first input terminal 401, the second input terminal 402, and the ground terminal 400. The first input terminal 401 is connected to the first filter 131 of the duplexer 13. The second input terminal 402 is connected to the second filter 141 of the duplexer 14. The ground terminal 400 is connected to a ground electrode.

The switch 43 further includes an output terminal 431, a first input/output terminal 432, a second input/output terminal 433, and a third input/output terminal 434. The output terminal 431 is connected to the low noise amplifier 51. The first input/output terminal 432 is connected to the first inductor 18a. That is, the first inductor 18a is connected between a path between the output terminal 431 and the low noise amplifier 51 and the first input/output terminal 432. The second input/output terminal 433 and the third input/output terminal 434 are connected to the second inductor 19a. More specifically, the second inductor 19a is connected between the second input/output terminal 433 and the third input/output terminal 434.

The switch 43 can switch between the first state and the second state.

In the first state, as shown in FIG. 7A, the first input terminal 401 and the first input/output terminal 432 are connected, the first input terminal 401 and the third input/output terminal 434 are connected, and the second input/output terminal 433 and the ground terminal 400 are connected. In the first state, the second input terminal 402 and the second input/output terminal 433 are not connected, the third input/output terminal 434 and the output terminal 431 are not connected, and the first input/output terminal 432 and the ground terminal 400 are not connected. That is, in the first state, the first inductor 18a is connected between the first filter 131 and the low noise amplifier 51. In addition, in the first state, a path between the first inductor 18a and the first filter 131 is connected to the ground electrode with the second inductor 19a interposed therebetween.

In addition, in the second state, as shown in FIG. 7B, the second input terminal 402 and the second input/output terminal 433 are connected, the third input/output terminal 434 and the output terminal 431 are connected, and the first input/output terminal 432 and the ground terminal 400 are connected. In the second state, the first input terminal 401 and the first input/output terminal 432 are not connected to each other, the first input terminal 401 and the third input/output terminal 434 are not connected to each other, and the second input/output terminal and the ground terminal 400 are not connected.

For example, the switch 40 is controlled by an RF signal processing circuit 21 of a signal processing circuit 2.

Each of the first inductor 18a and the second inductor 19a functions as a portion of a circuit connected between the first filter 131 or the second filter 141 and the low noise amplifier 51.

It is preferable that the first inductor 18a and the second inductor 19a are disposed adjacent to each other.

It is preferable that the direction of the winding axis of the first inductor 18a and the direction of the winding axis of the second inductor 19a are parallel to each other.

2 Operation

Hereinafter, an operation of the high frequency module 1 according to Embodiment 4 will be described with reference to FIGS. 7A and 7B.

In the high frequency module 1 according to Embodiment 4, when (e.g., in response to) the reception signal in the first communication band is received, the switch 43 is set to the first state as shown in FIG. 7A. Therefore, the low noise amplifier 51 is connected to the first filter 131 with the first inductor 18a interposed therebetween. Furthermore, a path between the first inductor 18a and the first filter 131 is connected to the ground electrode with the second inductor 19a interposed therebetween. Therefore, the high frequency module 1 can highly accurately remove the transmission signal in the first communication band which enters the switch 40 from the first filter 131 when (e.g., in response to) receiving the reception signal in the first communication band.

On the other hand, in the high frequency module 1 according to Embodiment 4, when (e.g., in response to) the reception signal in the second communication band is received, the switch 43 is set to the second state as shown in FIG. 7B. Therefore, the low noise amplifier 51 is connected to the second filter 141 with the second inductor 19a interposed therebetween. Furthermore, a path between the low noise amplifier 51 and the second inductor 19a is connected to the ground electrode with the first inductor 18a interposed therebetween. That is, the high frequency module 1 replaces the inductor connected to the low noise amplifier 51 and the inductor connected to the ground electrode, when (e.g., in response to) receiving the reception signal in the first communication band and when (e.g., in response to)

receiving the reception signal in the second communication band. In this manner, the high frequency module 1 can easily change the characteristics of the circuit between the first input terminal 401 or the second input terminal 402 of the switch 40 and the low noise amplifier 51, when (e.g., in response to) receiving the reception signal in the first communication band and when (e.g., in response to) receiving the reception signal in the second communication band.

Advantageous Effects

The high frequency module 1 according to Embodiment 4 includes the low noise amplifier 51 that amplifies the reception signal, the switch 43, the first inductor 18a, the second inductor 19a, the first filter 131, and the second filter 141. The switch 43 includes the first input terminal 401, the second input terminal 402, the output terminal 431, the first input/output terminal 432, the second input/output terminal 433, the third input/output terminal 434, and the ground terminal 400. The first inductor 18a is connected between a path between the input terminal of the low noise amplifier 51 and the output terminal 431 and the first input/output terminal 432. The second inductor 19a is connected between the second input/output terminal 433 and the third input/output terminal 434. The first filter 131 is connected to the first input terminal 401, and has the pass band including the reception band of the first communication band. The second filter 141 is connected to the second input terminal 402, and has the pass band including the reception band of the second communication band. The second communication band has a wider transmission-reception gap than that of the first communication band. The switch 43 can switch between the first state and the second state. In the first state of the switch 43, the first input terminal 401 and the first input/output terminal 432 are connected, the first input terminal 401 and the third input/output terminal 434 are connected, the second input/output terminal 433 and the ground terminal 400 are connected, the second input terminal 402 and the second input/output terminal 433 are not connected, the third input/output terminal 434 and the output terminal 431 are not connected, and the first input/output terminal 432 and the ground terminal 400 are not connected. In the second state of the switch 43, the second input terminal 402 and the second input/output terminal 433 are connected, the third input/output terminal 434 and the output terminal 431 are connected, the first input/output terminal 432 and the ground terminal 400 are connected, the first input terminal 401 and the first input/output terminal 432 are not connected, the first input terminal 401 and the third input/output terminal 434 are not connected to each other, and the second input/output terminal 433 and the ground terminal 400 are not connected.

In this manner, in the high frequency module 1, when (e.g., in response to) the reception signal in the first communication band is received, the switch 43 is set to the first state. Accordingly, a leakage of the transmission signal in the first communication band to the low noise amplifier 51 can be reduced. In addition, in the high frequency module 1, when (e.g., in response to) the reception signal in the second communication band is received, the switch 43 is set to the second state. Accordingly, a loss of the reception signal in the second communication band can be reduced.

Embodiment 5

1 Operation

The high frequency module 1 according to Embodiment 5 includes the same configurations as those of the high frequency module 1 according to Embodiment 4. In the high frequency module 1 according to Embodiment 5, the switch 43 can switch between the third state and the fourth state in addition to the first state and the second state.

Figure 8A:
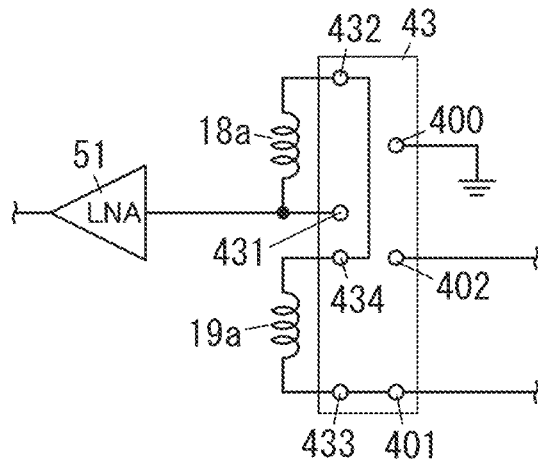
FIG. 8A is a partial circuit diagram showing a connection state when a switch of a high frequency module according to Embodiment 5 is in a third state.

In the third state, as shown in FIG. 8A, the first input terminal 401 and the second input/output terminal 433 are connected, and the first input/output terminal 432 and the third input/output terminal 434 are connected. In the third state, the second input terminal 402 and the first input/output terminal 432 are not connected to each other, the second input terminal 402 and the second input/output terminal 433 are not connected to each other, and the third input/output terminal 434 and the output terminal 431 are not connected. That is, in the third state, the series circuit of the first inductor 18a and the second inductor 19a is connected between the first filter 131 and the low noise amplifier 51.

Figure 8B:
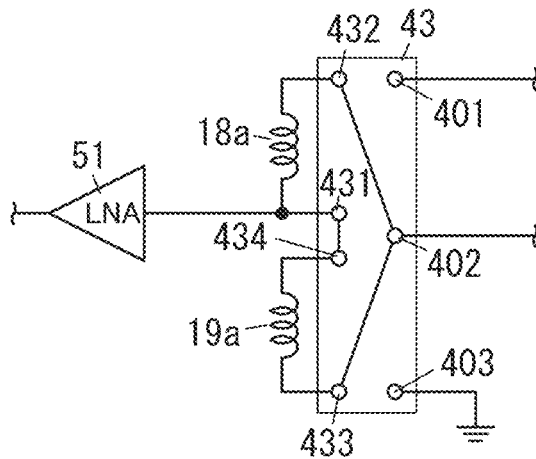
FIG. 8B is a partial circuit diagram showing a connection state when the switch of the high frequency module is in a fourth state.

In addition, in the fourth state, as shown in FIG. 8B, the second input terminal 402 and the first input/output terminal 432 are connected, the second input terminal 402 and the second input/output terminal 433 are connected, and the third input/output terminal 434 and the output terminal 431 are connected. In the fourth state, the first input terminal 401 and the second input/output terminal 433 are not connected, and the first input/output terminal 432 and the third input/output terminal 434 are not connected. That is, in the fourth state, the parallel circuit of the first inductor 18a and the second inductor 19a is connected between the second filter 141 and the low noise amplifier 51.

In this manner, the high frequency module 1 can easily change the characteristics of the circuit between the first input terminal 401 or the second input terminal 402 of the switch 40 and the low noise amplifier 51, when (e.g., in response to) receiving the reception signal in the first communication band and when (e.g., in response to) receiving the reception signal in the second communication band.

In the high frequency module 1 according to Embodiment 5, the switch 43 may be set to the third state when (e.g., in response to) the reception signal in the first communication band is received, and the switch 43 may be set to the second state when (e.g., in response to) the reception signal in the second communication band is received. Similarly, in the high frequency module 1 according to Embodiment 5, the switch 43 may be set to the first state when (e.g., in response to) the reception signal in the first communication band is received, and the switch 43 may be set to the fourth state when (e.g., in response to) the reception signal in the second communication band is received.

In addition, in the high frequency module 1 according to Embodiment 5, when (e.g., in response to) the reception signal in the first communication band is received, the same connection as that in the fourth state may be performed. That is, when (e.g., in response to) the reception signal in the first communication band is received, the first input terminal 401 and the first input/output terminal 432 may be connected, the first input terminal 401 and the second input/output terminal 433 may be connected, and the third input/output terminal 434 and the output terminal 431 may be connected. In this case, the second input terminal 402 and the second input/output terminal 433 are not connected, and the first input/output terminal 432 and the third input/output terminal 434 are not connected.

In addition, in the high frequency module 1 according to Embodiment 5, when (e.g., in response to) the reception signal in the second communication band is received, the same connection as that in the third state may be performed. That is, the second input terminal 402 and the second input/output terminal 433 may be connected, and the first input/output terminal 432 and the third input/output terminal 434 may be connected. In this case, the first input terminal 401 and the first input/output terminal 432 are not connected, the first input terminal 401 and the second input/output terminal 433 are not connected to each other, and the third input/output terminal 434 and the output terminal 431 are not connected.

In this manner, in the high frequency module 1, in each case when (e.g., in response to) the reception signal in the first communication band is received and when (e.g., in response to) the reception signal in the second communication band is received, it is possible to perform at least one of reducing the leakage of the transmission signal in the first communication band to the low noise amplifier 51 and reducing the loss of the reception signal in the second communication band. Furthermore, the reception characteristics can be optimized in each case when (e.g., in response to) the reception signal in the first communication band is received and when (e.g., in response to) the reception signal in the second communication band is received.

Advantageous Effects

In the high frequency module 1 according to Embodiment 5, the switch 43 can switch a mode to a state in which the first input terminal 401 or the second input terminal 402 and the second input/output terminal 433 are connected, the first input/output terminal 432 and the third input/output terminal 434 are connected, the first input terminal 401 or the second input terminal 402 and the first input/output terminal 432 are not connected, the first input terminal 401 or the second input terminal 402 and the second input/output terminal 433 are not connected, and the third input/output terminal 434 and the output terminal 431 are not connected. In addition, in the high frequency module 1 according to Embodiment 5, the switch 43 can switch a mode to a state where the first input terminal 401 or the second input terminal 402 and the first input/output terminal 432 are connected, the first input terminal 401 or the second input terminal 402 and the second input/output terminal 433 are connected, the third input/output terminal 434 and the output terminal 431 are connected, the first input terminal 401 or the second input terminal 402 and the second input/output terminal 433 are not connected, and the first input/output terminal 432 and the third input/output terminal 434 are not connected. In this manner, in the high frequency module 1, in each case when (e.g., in response to) the reception signal in the first communication band is received and when (e.g., in response to) the reception signal in the second communication band is received, it is possible to perform at least one of reducing the leakage of the transmission signal in the first communication band to the low noise amplifier 51 and reducing the loss of the reception signal in the second communication band. Furthermore, the reception characteristics can be optimized in each case when (e.g., in response to) the reception signal in the first communication band is received and when (e.g., in response to) the reception signal in the second communication band is received.

Embodiment 6

1 Operation

The high frequency module 1 according to Embodiment 6 includes the same configurations as those of the high frequency module 1 according to Embodiment 4. In the high frequency module 1 according to Embodiment 6, the switch

43 can switch between a fifth state and a sixth state in addition to the first state and the second state.

Figure 9A:
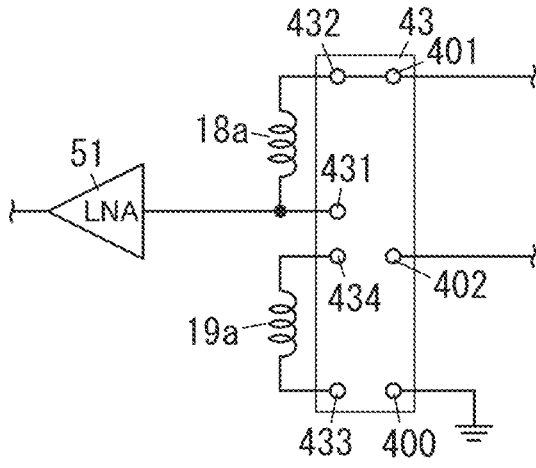
FIG. 9A is a partial circuit diagram showing a connection state when a switch of a high frequency module according to Embodiment 6 is in a fifth state.

In the fifth state, as shown in FIG. 9A, the first input terminal 401 and the first input/output terminal 432 are connected. In the fifth state, the second input terminal 402 and the second input/output terminal 433 are not connected, and the third input/output terminal 434 and the output terminal 431 are not connected. That is, in the fifth state, the first inductor 18*a* is connected between the first filter 131 and the low noise amplifier 51.

Figure 9B:
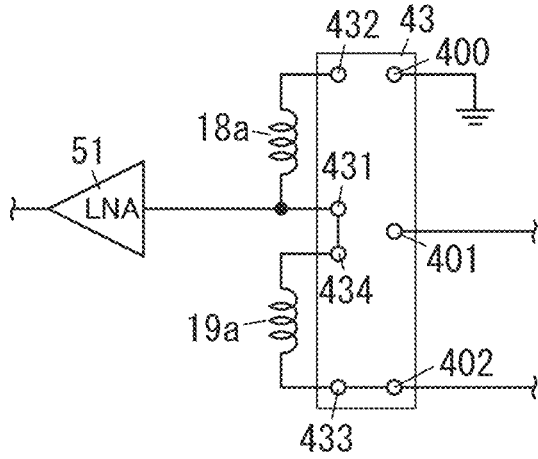
FIG. 9B is a partial circuit diagram showing a connection state when the switch of the high frequency module is in a sixth state.

In addition, in the sixth state, as shown in FIG. 9B, the second input terminal 402 and the second input/output terminal 433 are connected, and the third input/output terminal 434 and the output terminal 431 are connected. In the sixth state, the first input terminal 401 and the first input/output terminal 432 are not connected. That is, in the sixth state, the second inductor 19*a* is connected between the second filter 141 and the low noise amplifier 51.

In this manner, the high frequency module 1 can easily change the characteristics of the circuit between the first input terminal 401 or the second input terminal 402 of the switch 40 and the low noise amplifier 51, when (e.g., in response to) receiving the reception signal in the first communication band and when (e.g., in response to) receiving the reception signal in the second communication band.

In the high frequency module 1 according to Embodiment 6, the switch 43 may be set to the fifth state when (e.g., in response to) the reception signal in the first communication band is received, and the switch 43 may be set to the second state when (e.g., in response to) the reception signal in the second communication band is received. Similarly, in the high frequency module 1 according to Embodiment 5, the switch 43 may be set to the first state when (e.g., in response to) the reception signal in the first communication band is received, and the switch 43 may be set to the sixth state when (e.g., in response to) the reception signal in the second communication band is received.

In addition, in the high frequency module 1 according to Embodiment 6, when (e.g., in response to) the reception signal in the second communication band is received, the same connection as that in the fifth state may be performed. That is, the second input terminal 402 and the first input/output terminal 432 may be connected. In this case, the first input terminal 401 and the second input/output terminal 433 are not connected, and the third input/output terminal 434 and the output terminal 431 are not connected.

In addition, in the high frequency module 1 according to Embodiment 6, when (e.g., in response to) the reception signal in the first communication band is received, the same connection as that in the sixth state may be performed. That is, the first input terminal 401 and the second input/output terminal 433 may be connected, and the third input/output terminal 434 and the output terminal 431 may be connected. In this case, the second input terminal 402 and the first input/output terminal 432 are not connected.

In this manner, in the high frequency module 1, in each case when (e.g., in response to) the reception signal in the first communication band is received and when (e.g., in response to) the reception signal in the second communication band is received, it is possible to perform at least one of reducing the leakage of the transmission signal in the first communication band to the low noise amplifier 51 and reducing the loss of the reception signal in the second communication band. Furthermore, the reception characteristics can be optimized in each case when (e.g., in response to) the reception signal in the first communication band is received and when (e.g., in response to) the reception signal in the second communication band is received.

Advantageous Effects

In the high frequency module 1 according to Embodiment 6, the switch 43 can switch a mode to a state where the first input terminal 401 or the second input terminal 402 and the first input/output terminal 432 are connected, the first input terminal 401 or the second input terminal 402 and the second input/output terminal 433 are not connected, and the third input/output terminal 434 and the output terminal 431 are not connected. In addition, in the high frequency module 1 according to Embodiment 6, the switch 43 can switch a mode to a state where the first input terminal 401 or the second input terminal 402 and the second input/output terminal 433 are connected, the third input/output terminal 434 and the output terminal 431 are connected, and the first input terminal 401 or the second input terminal 402 and the first input/output terminal 432 are not connected. In this manner, in the high frequency module 1, in each case when (e.g., in response to) the reception signal in the first communication band is received and when (e.g., in response to) the reception signal in the second communication band is received, it is possible to perform at least one of reducing the leakage of the transmission signal in the first communication band to the low noise amplifier 51 and reducing the loss of the reception signal in the second communication band. Furthermore, the reception characteristics can be optimized in each case when (e.g., in response to) the reception signal in the first communication band is received and when (e.g., in response to) the reception signal in the second communication band is received.

Embodiment 7

1 Configuration

Figure 10:
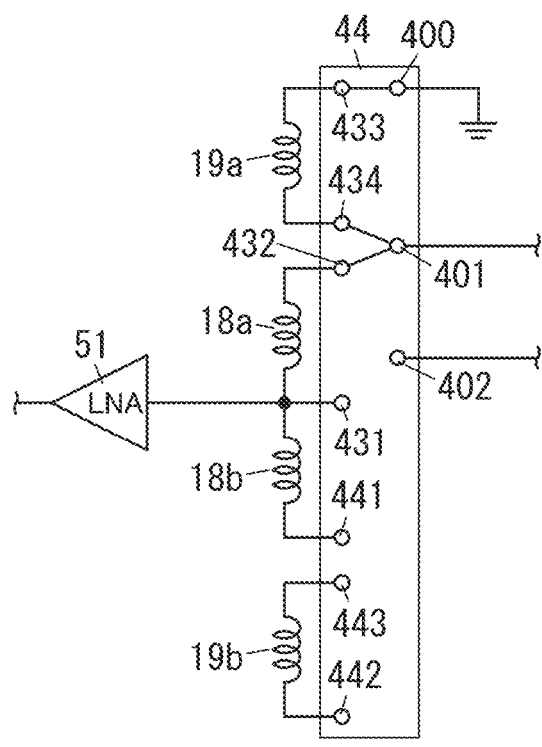
FIG. 10 is a partial circuit diagram showing a connection state when a switch of a high frequency module according to Embodiment 7 is in the first state.
Figure 11:
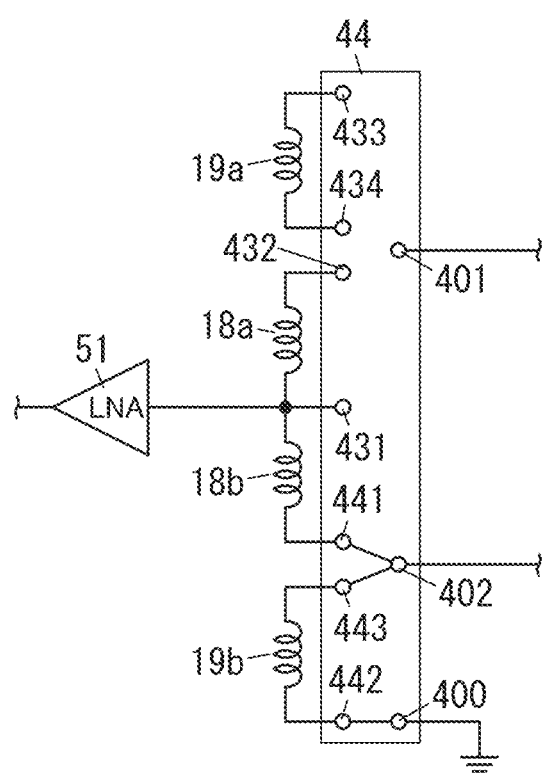
FIG. 11 is a partial circuit diagram showing a connection state when the switch of the high frequency module according to Embodiment 7 is in a seventh state.

As shown in FIGS. 10 and 11, the high frequency module 1 according to Embodiment 7 further includes a third inductor 18*b* and a fourth inductor 19*b*, in addition to the configurations of the high frequency module 1 according to Embodiment 4, and includes a switch 44 instead of the switch 43. The high frequency module 1 according to Embodiment 7 includes all of the configurations excluding the switch 43 in the high frequency module 1 according to Embodiment 4, and thus, description of the same configuration will be omitted.

The switch 44 is a switch for selecting whether each of the first filter 131 of the duplexer 13 and the second filter 141 of the duplexer 14 is connected to any one of the first inductor 18*a*, the second inductor 19*a*, the third inductor 18*b*, the fourth inductor 19*b*, and the low noise amplifier 51. In addition, the switch 44 is a switch for selecting whether the first inductor 18*a*, the second inductor 19*a*, the third inductor 18*b*, and the fourth inductor 19*b* are respectively connected to each other. In addition, the switch 44 is a switch for selecting whether the ground electrode is connected to any one of the first inductor 18*a*, the second inductor 19*a*, the third inductor 18*b*, and the fourth inductor 19*b*. For example, the switch 44 can be configured to include a dual pole dual throw (DPDT) type switch.

The switch 44 includes the first input terminal 401, the second input terminal 402, and the ground terminal 400. The first input terminal 401 is connected to the first filter 131 of the duplexer 13. The second input terminal 402 is connected to the second filter 141 of the duplexer 14. The ground terminal 400 is connected to a ground electrode.

The switch 44 further includes the output terminal 431, the first input/output terminal 432, the second input/output terminal 433, the third input/output terminal 434, a fourth input/output terminal 441, a fifth input/output terminal 442, and a sixth input/output terminal 443. The output terminal 431 is connected to the low noise amplifier 51. The first input/output terminal 432 is connected to the first inductor 18a. That is, the first inductor 18a is connected between a path between the output terminal 431 and the low noise amplifier 51 and the first input/output terminal 432. The second input/output terminal 433 and the third input/output terminal 434 are connected to the second inductor 19a. More specifically, the second inductor 19a is connected between the second input/output terminal 433 and the third input/output terminal 434. The fourth input/output terminal 441 is connected to the third inductor 18b. That is, the third inductor 18b is connected between a path between the output terminal 431 and the low noise amplifier 51 and the fourth input/output terminal 441. The fifth input/output terminal 442 and the sixth input/output terminal 443 are connected to the fourth inductor 19b. More specifically, the fourth inductor 19b is connected between the fifth input/output terminal 442 and the sixth input/output terminal 443.

The switch 44 can switch between the first state and a seventh state.

In the first state, as shown in FIG. 10, the first input terminal 401 and the first input/output terminal 432 are connected, the first input terminal 401 and the third input/output terminal 434 are connected, and the second input/output terminal 433 and the ground terminal 400 are connected. In the first state, the second input terminal 402 and the fourth input/output terminal 441 are not connected, the second input terminal 402 and the sixth input/output terminal 443 are not connected to each other, and the fifth input/output terminal 442 and the ground terminal 400 are not connected. That is, in the first state, the first inductor 18a is connected between the first filter 131 and the low noise amplifier 51. In addition, in the first state, a path between the first inductor 18a and the first filter 131 is connected to the ground electrode with the second inductor 19a interposed therebetween.

In addition, in the seventh state, as shown in FIG. 11, the second input terminal 402 and the fourth input/output terminal 441 are connected, the second input terminal 402 and the sixth input/output terminal 443 are connected, and the fifth input/output terminal 442 and the ground terminal 400 are connected. In the seventh state, the first input terminal 401 and the first input/output terminal 432 are not connected, the first input terminal 401 and the third input/output terminal 434 are not connected, and the second input/output terminal 433 and the ground terminal 400 are not connected. That is, in the seventh state, the third inductor 18b is connected between the second filter 141 and the low noise amplifier 51. In addition, in the second state, a path between the third inductor 18b and the second filter 141 is connected to the ground electrode with the fourth inductor 19b interposed therebetween.

For example, the switch 44 is controlled by the RF signal processing circuit 21 of the signal processing circuit 2.

2 Operation

In the first state, as shown in FIG. 10, the first input terminal 401 and the first input/output terminal 432 are connected, the first input terminal 401 and the third input/output terminal 434 are connected, and the second input/output terminal 433 and the ground terminal 400 are connected. That is, in the first state, the first inductor 18a is connected between the first filter 131 and the low noise amplifier 51. In addition, in the first state, a path between the first inductor 18a and the first filter 131 is connected to the ground electrode with the second inductor 19a interposed therebetween.

In addition, in the seventh state, as shown in FIG. 11, the second input terminal 402 and the fourth input/output terminal 441 are connected, the second input terminal 402 and the sixth input/output terminal 443 are connected, and the fifth input/output terminal 442 and the ground terminal 400 are connected. That is, in the second state, the third inductor 18b is connected between the second filter 141 and the low noise amplifier 51. In addition, in the second state, a path between the third inductor 18b and the second filter 141 is connected to the ground electrode with the fourth inductor 19b interposed therebetween.

In this manner, the high frequency module 1 can easily change the characteristics of the circuit between the first input terminal 401 or the second input terminal 402 of the switch 40 and the low noise amplifier 51, when (e.g., in response to) receiving the reception signal in the first communication band and when (e.g., in response to) receiving the reception signal in the second communication band.

In addition, in the high frequency module 1 according to Embodiment 7, when (e.g., in response to) the reception signal in the second communication band is received, the switch 44 may be set to the second state, and when (e.g., in response to) the reception signal in the first communication band is received, the same connection as that in the seventh state may be performed. That is, when (e.g., in response to) the reception signal in the first communication band is received, the first input terminal 401 and the fourth input/output terminal 441 may be connected, the first input terminal 401 and the sixth input/output terminal 443 may be connected, and the fifth input/output terminal 442 and the ground terminal 400 may be connected. In this case, the second input terminal 402 and the first input/output terminal 432 are not connected, the second input terminal 402 and the third input/output terminal 434 are not connected, and the second input/output terminal 433 and the ground terminal 400 are not connected.

In this manner, in the high frequency module 1, in each case when (e.g., in response to) the reception signal in the first communication band is received and when (e.g., in response to) the reception signal in the second communication band is received, a leakage of the transmission signal in the first communication band to the low noise amplifier 51 can be reduced. Furthermore, the reception characteristics can be optimized in each case when (e.g., in response to) the reception signal in the first communication band is received and when (e.g., in response to) the reception signal in the second communication band is received.

Advantageous Effects

The high frequency module 1 according to Embodiment 7 further includes the third inductor 18b and the fourth inductor 19b. The switch 44 includes the fourth input/output terminal 441, the fifth input/output terminal 442, and the sixth input/output terminal 443. The third inductor 18b is connected between a path between the input terminal of the low noise amplifier 51 and the output terminal 431 and the fourth input/output terminal 441. The fourth inductor 19b is connected between the fifth input/output terminal 442 and the sixth input/output terminal 443. The switch 44 can switch a mode to a state where the first input terminal 401 or the second input terminal 402 and the fourth input/output terminal 441 are connected, the first input terminal 401 or the second input terminal 402 and the sixth input/output terminal 443 are connected, the fifth input/output terminal 442 and the ground terminal 400 are connected, the first input terminal 401 or the second input terminal 402 and the first input/output terminal 432 are not connected, the first input terminal 401 or the second input terminal 402 and the third input/output terminal 434 are not connected, and the second input/output terminal 433 and the ground terminal 400 are not connected.

In this manner, in the high frequency module 1, in each case when (e.g., in response to) the reception signal in the first communication band is received and when (e.g., in response to) the reception signal in the second communication band is received, a leakage of the transmission signal in the first communication band to the low noise amplifier 51 can be reduced. Furthermore, the reception characteristics can be optimized in each case when (e.g., in response to) the reception signal in the first communication band is received and when (e.g., in response to) the reception signal in the second communication band is received.

Modification Examples

Hereinafter, modification examples of the embodiments will be described.

Figure 13:
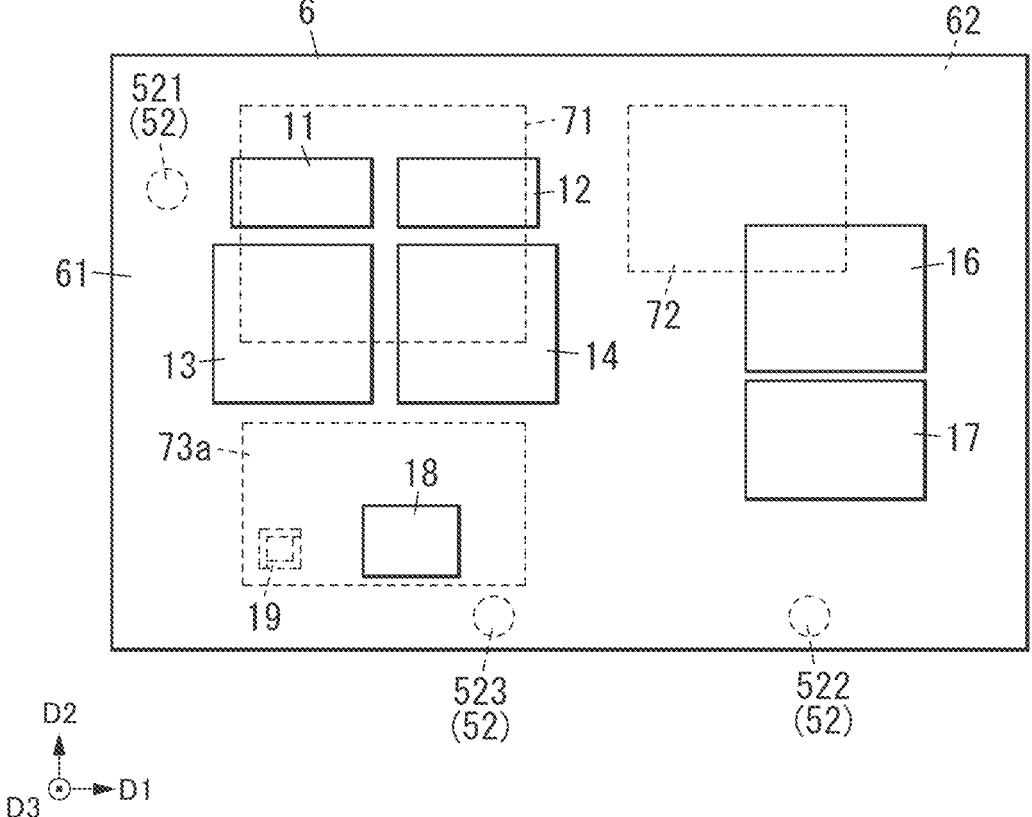
FIG. 13 is a plan view of a high frequency module according to a modification example.

As shown in FIG. 13, the high frequency module 1 according to Embodiments 1 to 7 includes the low noise amplifier 51 and the switch 40 instead of the IC chip 73 and the second inductor 19, and may further include an IC chip 73a including the second inductor 19. For example, the second inductor 19 is an Integrated passive device (IPD) formed by a thin film process on a silicon substrate. That is, the second inductor 19 is formed inside the IC chip 73a instead of the first main surface 61 of the substrate 6. In this manner, the second inductor 19 can be reduced in size, and can be connected to the switch 40 and the inside of the IC chip 73a. Therefore, a loss of the reception signal is reduced. The IC chip 73a may include the switches 43 or 44 instead of the switch 40, and may include the second inductor 19a instead of the second inductor 19.

In addition, in the high frequency module 1 according to Embodiments 1 to 7, the first inductor 18 and the IC chip 73 including the switches 40, 43, or 44 may overlap each other in a plan view when viewed in the third direction D3. Here, description that "the first inductor 18 or 18a and the IC chip 73 overlap each other in the plan view when viewed in the third direction D3" is defined as at least a portion the first inductor 18 or 18a overlaps at least a portion of the IC chip 73 in a plan view when viewed in the third direction D3. In this manner, the length of the wiring portion between the first inductor 18 or 18a and the switch 40, 43, or 44 can be shortened, and a loss of the reception signal of the high frequency module 1 can be reduced.

In addition, the high frequency module 1 according to Embodiments 1 to 7 may be a high frequency module for reception, which does not include the transmission filters 132 and 142, the switch 15, the matching circuit 16, and the power amplifier 17.

In addition, in the high frequency module 1 according to Embodiment 7, the switch 44 may be capable of performing the same connection as that of any one of the first state to the sixth state of the switch 43 in the high frequency module 1 according to each of Embodiments 3 to 6. Similarly, in the high frequency module 1 according to Embodiment 6, the switch 43 may be capable of similarly connecting the third state or the fourth state of the switch 43 in the high frequency module 1 according to Embodiment 4.

In addition, the high frequency module 1 according to Embodiments 1 to 7 can receive the reception signals in three or more communication bands, and the switches 40, 43, and 44, or the first switch 41 and the second switch 42 and 42a may switch three or more states, depending on whether the reception signal is received from any communication band. The three or more states mean the above-described first state to seventh state, or a state where the terminal to be connected to the reception filter is connected to the above-described first state to seventh state instead of the first input terminal 401 or the second input terminal 402.

In addition, the high frequency module 1 according to Embodiment 3 may include a single switch that performs the same connection instead of the first switch 41 and the second switch 42a.

In addition, in the high frequency modules 1 according to Embodiments 4 to 7, in one or more states among the first state to seventh state of the switch 43 or 44, connection may be performed to switch between the second input/output terminal 433 and the third input/output terminal 434. The reason is as follows. Each of the second input/output terminal 433 and the third input/output terminal 434 corresponds to both ends of the second inductor 19a, and thus, use applications may be reversed. Similarly, in the high frequency module 1 according to Embodiment 7, in any one or more states of the switch 44, connection may be performed to switch between the fifth input/output terminal 442 and the sixth input/output terminal 443.

Aspects

The high frequency module (1) according to a first aspect includes the low noise amplifier (51), the switch (40), the first inductor (18), the second inductor (19), the first filter (131), and the second filter (141). The switch (40) includes the first input terminal (401), the second input terminal (402), the output terminal (403), the input/output terminal (404), and the ground terminal (400). The first inductor (18) is connected between the low noise amplifier (51) and the output terminal (403). The second inductor (19) is connected between a path between the first inductor (18) and the output terminal (403), and the input/output terminal (404). The first filter (131) is connected to the first input terminal (401), and has the pass band including the reception band of the first communication band. The second filter (141) is connected to the second input terminal (402), and has the pass band including the reception band of the second communication band. The second communication band has the wider transmission-reception gap (G1) than that of the first communication band. The switch (40) can switch between the first state and the second state. In the first state of the switch (40), the first input terminal (401) and the output terminal (403) are connected, the input/output terminal (404) and the ground terminal (400) are connected, and the second input terminal (402) is not connected to the input/output terminal (404). In the second state of the switch (40), the second input terminal (402) and the input/output terminal (404) are connected, the first input terminal (401) and the output terminal (403) are not connected, and the input/output terminal (404) and the ground terminal (400) are not connected.

According to the high frequency module (1) in the above-described aspect, when (e.g., in response to) the reception signal in the first communication band is received, the switch (40) is set to the first state. Accordingly, a leakage of the transmission signal in the first communication band to the low noise amplifier (51) can be reduced. In addition, in the high frequency module (1), when (e.g., in response to) the reception signal in the second communication band is received, the switch (40) is set to the second state. Accordingly, a loss of the reception signal in the second communication band can be reduced.

In the first aspect, in the high frequency module (1) according to a second aspect, the switch (40) includes the first switch (41) and the second switch (42). The first switch (41) includes the first input terminal (401) and the output terminal (403), and can switch between connection and non-connection between the first input terminal (401) and the output terminal (403). The second switch (42) includes the second input terminal (402), the input/output terminal (404), and the ground terminal (400), and can connect the input/output terminal (404) to the second input terminal (402) or the ground terminal (400). In the first state, the first switch (41) connects the first input terminal (401) and the output terminal (403). In the first state, the second switch (42) connects the input/output terminal (404) and the ground terminal (400), and does not connect the second input terminal (402) and the input/output terminal (404). In the first state, the first switch (41) does not connect the first input terminal (401) and the output terminal (403). In the second state, the second switch (42) connects the second input terminal (402) and the input/output terminal (404), and does not connect the input/output terminal (404) and the ground terminal (400).

According to the high frequency module (1) in the above-described aspect, when (e.g., in response to) the reception signal in the first communication band is received, a leakage of the transmission signal in the first communication band to the low noise amplifier (51) can be reduced. In addition, in the high frequency module (1), when (e.g., in response to) the reception signal in the second communication band is received, a loss of the reception signal in the second communication band can be reduced. In addition, in the high frequency module (1), the switch (40) is separated into the first switch (41) and the second switch (42). Therefore, a loss in the switch (40) can be reduced.

In the first or second aspect, the high frequency module (1) according to a third aspect further includes the second low noise amplifier (512) and the third inductor (189). The second low noise amplifier (512) is different from the first low noise amplifier (51). The third inductor (189) is connected to the second low noise amplifier (512). The third inductor (189) is connected between the second low noise amplifier (512) and a path between the second inductor (19) and the first inductor (18).

According to the high frequency module (1) in the above-described aspect, in receiving the communication band different from the first communication band and the second communication band, the second low noise amplifier (512) is used, and the third inductor (189) and the second inductor (19) can be connected between the second low noise amplifier (512) and a reception path of the communication band. Therefore, reception characteristics of the third communication band can be optimized.

The high frequency module (1) according to a fourth aspect includes the low noise amplifier (51), the switch (43, 44), the first inductor (18*a*), the second inductor (19*a*), the first filter (131), and the second filter (141). The switch (43, 44) includes the first input terminal (401), the second input terminal (402), the output terminal (431), the first input/output terminal (432), the second input/output terminal (433), the third input/output terminal (434), and the ground terminal (400). The first inductor (18*a*) is connected between a path between the low noise amplifier (51) and the output terminal (431), and the first input/output terminal (432). The second inductor (19*a*) is connected between the second input/output terminal (433) and the third input/output terminal (434). The first filter (131) is connected to the first input terminal (401), and has the pass band including the reception band of the first communication band. The second filter (141) is connected to the second input terminal (402), and has the pass band including the reception band of the second communication band. The second communication band has the wider transmission-reception gap (G1) than that of the first communication band. The switch (43, 44) can switch between the first state and the second state. In the first state of the switch (43, 44), the first input terminal (401) and the first input/output terminal (432) are connected, the first input terminal (401) and the third input/output terminal (434) are connected, the second input/output terminal (433) and the ground terminal (400) are connected, the second input terminal (402) and the second input/output terminal (433) are not connected, the third input/output terminal (434) and the output terminal (431) are not connected, and the first input/output terminal (432) and the ground terminal (400) are not connected. In the second state of the switch (43, 44), the second input terminal (402) and a second input/output terminal (433) are connected, the third input/output terminal (434) and the output terminal (431) are connected, the first input/output terminal (432) and the ground terminal (400) are connected, the first input terminal (401) and the first input/output terminal (432) are not connected to each other, the first input terminal (401) and the third input/output terminal (434) are not connected to each other, and the second input/output terminal (433) and the ground terminal (400) are not connected.

According to the high frequency module (1) in the above-described aspect, when (e.g., in response to) the reception signal in the first communication band is received, the switch (43) is set to the first state. Accordingly, a leakage of the transmission signal in the first communication band to the low noise amplifier (51) can be reduced. In addition, in the high frequency module (1), when (e.g., in response to) the reception signal in the second communication band is received, the switch (43) is set to the second state. Accordingly, a loss of the reception signal in the second communication band can be reduced.

In the fourth aspect, in the high frequency module (1) according to a fifth aspect, the switch (43, 44) can further switch a mode to at least one of a state where the first input terminal (401) or the second input terminal (402) and the second input/output terminal (433) are connected, the first input/output terminal (432) and the third input/output terminal (434) are connected, the first input terminal (401) or the second input terminal (402) and the first input/output terminal (432) are not connected, the first input terminal (401) or the second input terminal (402) and the second input/output terminal (433) are not connected, and the third input/output terminal (434) and the output terminal (431) are not connected, and a state where the first input terminal (401) or the second input terminal (402) and the first input/output terminal (432) are connected, the first input terminal (401) or the second input terminal (402) and the second input/output terminal (433) are connected, the third input/output terminal (434) and the output terminal (431) are connected, the first input terminal (401) or the second input terminal (402) and the second input/output terminal (433) are not connected, and the first input/output terminal (432) and the third input/output terminal (434) are not connected.

According to the high frequency module (1) in the above-described aspect, in each case when (e.g., in response to) the reception signal in the first communication band is received and when (e.g., in response to) the reception signal in the second communication band is received, it becomes possible to perform at least one of reducing a leakage of the transmission signal in the first communication band to the low noise amplifier (51) and reducing a loss of the reception signal in the second communication band. Furthermore, the reception characteristics can be optimized in each case when (e.g., in response to) the reception signal in the first communication band is received and when (e.g., in response to) the reception signal in the second communication band is received.

In the fourth or fifth aspect, in the high frequency module (1) according to a sixth aspect, the switch (43, 44) can further switch a mode to at least one of a state where the first input terminal (401) or the second input terminal (402) and the first input/output terminal (432) are connected, the first input terminal (401) or the second input terminal (402) and the second input/output terminal (433) are not connected, and the third input/output terminal (434) and the output terminal (431) are not connected, and a state where the first input terminal (401) or the second input terminal (402) and the second input/output terminal (433) are connected, the third input/output terminal (434) and the output terminal (431) are connected, and the first input terminal (401) or the second input terminal (402) and the first input/output terminal (432) are not connected.

According to the high frequency module (1) in the above-described aspect, in each case when (e.g., in response to) the reception signal in the first communication band is received and when (e.g., in response to) the reception signal in the second communication band is received, it becomes possible to perform at least one of reducing a leakage of the transmission signal in the first communication band to the low noise amplifier (51) and reducing a loss of the reception signal in the second communication band. Furthermore, the reception characteristics can be optimized in each case when (e.g., in response to) the reception signal in the first communication band is received and when (e.g., in response to) the reception signal in the second communication band is received.

In any one of the fourth to sixth aspects, the high frequency module (1) according to a seventh aspect, further includes the third inductor (18b) and the fourth inductor (19b). The switch (44) further includes the fourth input/output terminal (441), the fifth input/output terminal (442), and the sixth input/output terminal (443). The third inductor (18b) is connected between a path between the low noise amplifier (51) and the output terminal (431), and the fourth input/output terminal (441). The fourth inductor (19b) is connected between the fifth input/output terminal (442) and the sixth input/output terminal (443). The switch (44) can switch a mode to a state where the first input terminal (401) or the second input terminal (402) and the fourth input/output terminal (441) are connected, the first input terminal (401) or the second input terminal (402) and the sixth input/output terminal (443) are connected, the fifth input/output terminal (442) and the ground terminal (400) are connected, the first input terminal (401) or the second input terminal (402) and the first input/output terminal (432) are not connected, the first input terminal (401) or the second input terminal (402) and the third input/output terminal (434) are not connected, and the second input/output terminal (433) and the ground terminal (400) are not connected.

According to the high frequency module (1) in the above-described aspect, in each case when (e.g., in response to) the reception signal in the first communication band is received and when (e.g., in response to) the reception signal in the second communication band is received, a leakage of the transmission signal in the first communication band to the low noise amplifier (51) can be reduced. Furthermore, the reception characteristics can be optimized in each case when (e.g., in response to) the reception signal in the first communication band is received and when (e.g., in response to) the reception signal in the second communication band is received.

In any one of the first to seventh aspects, the high frequency module (1) according to an eighth aspect further includes the substrate (6). The substrate (6) includes the first main surface (61) and the second main surface (62) which face each other. The first inductor (18, 18a) and the second inductor (19, 19a) are disposed adjacent to each other on the first main surface (61) of the substrate (6). The direction (A1) of the winding axis of the first inductor (18, 18a) and the direction (A2) of the winding axis of the second inductor (19, 19a) are parallel to each other.

According to the high frequency module (1) in the above-described aspect, when both the first inductor (18) and the second inductor (19) are used, a loss of the reception signal in the first communication band can be reduced, or a loss of the reception signal in the second communication band can be reduced.

In any one of the first to eighth aspects, in the high frequency module (1) according to a ninth aspect, the transmission signal in the first communication band is the transmission signal of the power class 2. The transmission signal in the second communication band is the transmission signal having lower maximum output power than that of power class 2.

According to the high frequency module (1) in the above-described aspect, when (e.g., in response to) g the reception signal in the first communication band is received, a leakage of the transmission signal in the first communication band to the low noise amplifier (51) can be reduced, and when (e.g., in response to) the reception signal in the second communication band is received, a loss of the reception signal in the second communication band can be reduced.

In any one of the first to ninth aspects, the high frequency module (1) according to a tenth aspect further includes the transmission filter (132). The transmission filter (132) has the pass band including the transmission band of the first communication band. The first filter (131) and the transmission filter (132) form the duplexer (13).

According to the high frequency module (1) in the above-described aspect, it is possible to correspond to both the transmission of the transmission signal and the reception of the reception signal in the first communication band, and influence of the transmission signal in the first communication band on the reception operation in the first communication band can be reduced.

In any one of the first to tenth aspects, the high frequency module (1) according to an eleventh aspect further includes the transmission filter (142). The transmission filter (142) has the pass band including the transmission band of the first communication band. The second filter (141) and the transmission filter (142) form the duplexer (14).

According to the high frequency module (1) in the above-described aspect, it is possible to correspond to both the transmission of the transmission signal and the reception of the reception signal, in the second communication band, and influence of the transmission signal in the second communication band on the reception operation in the second communication band can be reduced.

In any one of the first to eleventh aspects, the high frequency module (1) according to a twelfth aspect further includes the substrate (6). The substrate (6) includes the first main surface (61) and the second main surface (62) which face each other. The first inductor (18, 18*a*) and the second inductor (19, 19*a*) are disposed on the first main surface (61) of the substrate (6). The first inductor (18, 18*a*) is larger than the second inductor (19, 19*a*) in a plan view when viewed in the thickness direction (D3) of the substrate (6).

According to the high frequency module (1) in the above-described aspect, when (e.g., in response to) the first inductor (18, 18*a*) is connected between the low noise amplifier (51) and the first filter (131) or the second filter (141), a loss of the reception signal can be reduced. In addition, when the first inductor (18, 18*a*) and the second inductor (19, 19*a*) are connected between the low noise amplifier (51) and the first filter (131) or the second filter (141), influence of the second inductor (19, 19*a*) is reduced. Therefore, a loss of the reception signal is less likely to increase.

In any one of the first to twelfth aspects, the high frequency module (1) according to a thirteenth aspect further includes the IC chip (73*a*) including the second inductor (19) and the switch (40, 42, 43).

According to the high frequency module (1) in the above-described aspect, the second inductor (19, 19*a*) can be reduced in size, and can be connected to the switch (40, 42, 43) inside the IC chip (73*a*). Therefore, a loss of the reception signal is reduced.

In any one of the first to twelfth aspects, the high frequency module (1) according to a fourteenth aspect further includes the substrate (6) and the IC chip (73). The substrate (6) includes the first main surface (61) and the second main surface (62) which face each other. The IC chip (73) includes the low noise amplifier (51). The first inductor (18, 18*a*) is disposed on the first main surface (61) of the substrate (6). The IC chip (73) is disposed on the second main surface (62) of the substrate (6). The first inductor (18, 18*a*) and the IC chip (73) overlap each other in a plan view when viewed in the thickness direction (D3) of the substrate (6).

According to the high frequency module (1) in the above-described aspect, the length of the wiring portion between the first inductor (18, 18*a*) and the low noise amplifier (51) can be shortened. Therefore, a loss of the reception signal of the high frequency module (1) is reduced.

In the fourteenth aspect, in the high frequency module (1) according to a fifteenth aspect, the IC chip (73) further includes the switch (40, 42, 43). The second inductor (19, 19*a*) is disposed on the first main surface (61) of the substrate (6). The IC chip (73) is disposed on the second main surface (62) of the substrate (6). The second inductor (19, 19*a*) and the IC chip (73) overlap each other in a plan view when viewed in the thickness direction (D3) of the substrate (6).

In any one of the first to twelfth aspects, the high frequency module (1) according to a sixteenth aspect further includes the substrate (6) and the IC chip (73). The substrate (6) includes the first main surface (61) and the second main surface (62) which face each other. The IC chip (73) includes the low noise amplifier (51) and the switch (40, 42, 43). The second inductor (19, 19*a*) is disposed on the first main surface (61) of the substrate (6). The IC chip (73) is disposed on the second main surface (62) of the substrate (6). The second inductor (19, 19*a*) and the IC chip (73) overlap each other in a plan view when viewed in the thickness direction (D3) of the substrate (6).

According to the high frequency module (1) in the fifteenth or sixteenth aspect, the length of the wiring portion between the second inductor (19, 19*a*) and the switch (40, 42, 43) can be shortened. Therefore, a loss of the reception signal of the high frequency module (1) is reduced.

The communication device (100) according to a seventeenth aspect includes the high frequency module (1) according to any one of the first to sixteenth aspects, and the signal processing circuit (2) connected to the high frequency module (1).

According to the communication device (100) in the above-described aspect, it is possible to change characteristics of the circuit between the low noise amplifier (51) and the first filter (131) when the reception signal in the first communication band is received, and characteristics of the circuit between the low noise amplifier (51) and the second filter (141) when the reception signal in the second communication band is received.

What is claimed is:

1. A high frequency module comprising:
   a low noise amplifier;
   a switch including
     a first input terminal;
     a second input terminal;
     an output terminal;
     an input/output terminal; and
     a ground terminal;
   a first inductor connected between the low noise amplifier and the output terminal;
   a second inductor connected between a path between the first inductor and the output terminal, and the input/output terminal;
   a first filter connected to the first input terminal, the first filter having a pass band including a reception band of a first communication band; and
   a second filter connected to the second input terminal and having a pass band including a reception band of a second communication band having a wider transmission-reception gap than that of the first communication band,
   wherein the switch is configured to switch between a first state and a second state,
   wherein in the first state, the first input terminal and the output terminal are connected, the input/output terminal and the ground terminal are connected, and the second input terminal is not connected to the input/output terminal, and
   wherein in the second state, the second input terminal and the input/output terminal are connected, the first input terminal and the output terminal are not connected, and the input/output terminal and the ground terminal are not connected.

2. The high frequency module according to claim 1,
   wherein the switch includes
     a first switch including the first input terminal and the output terminal, the first switch being configured to switch between connection and non-connection of the first input terminal and the output terminal, and
     a second switch including the second input terminal, the input/output terminal, and the ground terminal, the second switch being configured to connect the input/output terminal to the second input terminal or the ground terminal,
   wherein in the first state, the first switch connects the first input terminal and the output terminal, the second switch connects the input/output terminal and the ground terminal, and does not connect the second input terminal and the input/output terminal, and
   wherein in the second state, the first switch does not connect the first input terminal and the output terminal, the second switch connects the second input terminal and the input/output terminal, and does not connect the input/output terminal and the ground terminal.

3. The high frequency module according to claim 1, further comprising:

a first low noise amplifier;

a second low noise amplifier different from the first low noise amplifier; and a third inductor connected to the second low noise amplifier, wherein the third inductor is connected between the second low noise amplifier and a path between the second inductor and the first inductor.

4. The high frequency module according to claim 1, further comprising:

a substrate including a first main surface; and a second main surface facing the first main surface, wherein the first inductor and the second inductor are disposed adjacent to each other on the first main surface of the substrate, and wherein a direction of a winding axis of the first inductor and a direction of a winding axis of the second inductor are parallel to each other.

5. The high frequency module according to claim 1, wherein a transmission signal in the first communication band is of a power class 2, and a transmission signal in the second communication band has maximum output power lower than that of the power class 2.

6. The high frequency module according to claim 1, further comprising:

a transmission filter having a pass band including a transmission band of the first communication band, wherein the first filter and the transmission filter form a first duplexer.

7. The high frequency module according to claim 1, further comprising:

a transmission filter having a pass band including a transmission band of the second communication band, wherein the second filter and the transmission filter form a second duplexer.

8. The high frequency module according to claim 1, further comprising:

a substrate including a first main surface; and a second main surface facing the first main surface, wherein the first inductor and the second inductor are disposed on the first main surface of the substrate, and wherein the first inductor is larger than the second inductor in a plan view when viewed in a thickness direction of the substrate.

9. The high frequency module according to claim 1, further comprising:

an integrated circuit (IC) chip including the second inductor and the switch.

10. The high frequency module according to claim 1, further comprising:

a substrate including a first main surface and a second main surface which face each other; and an integrated circuit (IC) chip including the low noise amplifier, wherein the first inductor is disposed on the first main surface of the substrate, wherein the IC chip is disposed on the second main surface of the substrate, and wherein the first inductor and the IC chip overlap each other in a plan view when viewed in a thickness direction of the substrate.

11. The high frequency module according to claim 10, wherein the IC chip further includes the switch, wherein the second inductor is disposed on the first main surface of the substrate, wherein the IC chip is disposed on the second main surface of the substrate, and wherein the second inductor and the IC chip overlap each other in the plan view when viewed in the thickness direction of the substrate.

12. A high frequency module comprising:

a low noise amplifier;

a switch including a first input terminal;

a second input terminal;

an output terminal;

a first input/output terminal;

a second input/output terminal;

a third input/output terminal; and a ground terminal;

a first inductor connected between a path between the low noise amplifier and the output terminal, and the first input/output terminal;

a second inductor connected between the second input/output terminal and the third input/output terminal;

a first filter connected to the first input terminal and having a pass band including a reception band of a first communication band; and a second filter connected to the second input terminal and having a pass band including a reception band of a second communication band having a wider transmission-reception gap than that of the first communication band, wherein the switch is configured to switch between a first state and a second state, wherein in the first state, the first input terminal and the first input/output terminal are connected, and the first input terminal and the third input/output terminal are connected, the second input/output terminal and the ground terminal are connected, the second input terminal and the second input/output terminal are not connected, the third input/output terminal and the output terminal are not connected, and the first input/output terminal and the ground terminal are not connected, and wherein in the second state, the second input terminal and the second input/output terminal are connected, the third input/output terminal and the output terminal are connected, the first input/output terminal and the ground terminal are connected, the first input terminal and the first input/output terminal are not connected to each other, the first input terminal and the third input/output terminal are not connected to each other, and the second input/output terminal and the ground terminal are not connected.

13. A communication device comprising:

the high frequency module according to claim 1; and a signal processing circuit connected to the high frequency module.

14. The high frequency module according to claim 12, further comprising:

a substrate including a first main surface; and a second main surface facing the first main surface; and an integrated circuit (IC) chip including the low noise amplifier and the switch, wherein the second inductor is disposed on the first main surface of the substrate, wherein the IC chip is disposed on the second main surface of the substrate, and wherein the second inductor and the IC chip overlap each other in a plan view when viewed in a thickness direction of the substrate.

15. The high frequency module according to claim 14, wherein the switch is configured to further switch to a state where the first input terminal or the second input terminal and the second input/output terminal are connected, the first input/output terminal and the third input/output terminal are connected, the first input terminal or the second input terminal and the first input/output terminal are not connected, the first input terminal or the second input terminal and the second input/output terminal are not connected, and the third input/output terminal and the output terminal are not connected, and a state where the first input terminal or the second input terminal and the first input/output terminal are connected, the first input terminal or the second input terminal and the second input/output terminal are connected, the third input/output terminal and the output terminal are connected, the first input terminal or the second input terminal and the second input/output terminal are not connected, and the first input/output terminal and the third input/output terminal are not connected.

16. The high frequency module according to claim 14, wherein the switch is configured to further switch to a state where the first input terminal or the second input terminal and the first input/output terminal are connected, the first input terminal or the second input terminal and the second input/output terminal are not connected, and the third input/output terminal and the output terminal are not connected, and a state where the first input terminal or the second input terminal and the second input/output terminal are connected, the third input/output terminal and the output terminal are connected, and the first input terminal or the second input terminal and the first input/output terminal are not connected.

17. The high frequency module according to claim 14, further comprising:

a third inductor; and a fourth inductor, wherein the switch further includes a fourth input/output terminal;

a fifth input/output terminal; and a sixth input/output terminal, wherein the third inductor is connected between a path between the low noise amplifier and the output terminal, and the fourth input/output terminal, wherein the fourth inductor is connected between the fifth input/output terminal and the sixth input/output terminal, and wherein the switch is configured to further switch to a state where the first input terminal or the second input terminal and the fourth input/output terminal are connected, the first input terminal or the second input terminal and the sixth input/output terminal are connected, the fifth input/output terminal and the ground terminal are connected, the first input terminal or the second input terminal and the first input/output terminal are not connected, the first input terminal or the second input terminal and the third input/output terminal are not connected, and the second input/output terminal and the ground terminal not connected.

18. The high frequency module according to claim 12, further comprising:

a transmission filter having a pass band including a transmission band of the first communication band, wherein the first filter and the transmission filter form a first duplexer.

19. The high frequency module according to claim 12, further comprising:

a substrate including a first main surface; and a second main surface facing the first main surface, wherein the first inductor and the second inductor are disposed on the first main surface of the substrate, and wherein the first inductor is larger than the second inductor in a plan view when viewed in a thickness direction of the substrate.

20. The high frequency module according to claim 19, further comprising an integrated circuit (IC) chip including the low noise amplifier, wherein the IC chip is disposed on the second main surface of the substrate, and wherein the first inductor and the IC chip overlap each other in the plan view when viewed in the thickness direction of the substrate.

* * * * *